(12) United States Patent
Grieve

(10) Patent No.: US 11,724,225 B2
(45) Date of Patent: Aug. 15, 2023

(54) FILTERING MEDIUM CLEANING APPARATUS AND METHOD

(71) Applicant: GITA GREEN, INC., Spencer, IA (US)

(72) Inventor: Dennis Grieve, Star, ID (US)

(73) Assignee: GITA GREEN, INC., Spencer, IA (US)

( * ) Notice: Subject to any disclaimer, the term of this patent is extended or adjusted under 35 U.S.C. 154(b) by 420 days.

(21) Appl. No.: 16/913,244

(22) Filed: Jun. 26, 2020

(65) Prior Publication Data
US 2020/0406182 A1    Dec. 31, 2020

Related U.S. Application Data

(60) Provisional application No. 63/010,289, filed on Apr. 15, 2020, provisional application No. 62/866,687, filed on Jun. 26, 2019.

(51) Int. Cl.
*B01D 46/00*    (2022.01)
*B01D 46/24*    (2006.01)

(52) U.S. Cl.
CPC ..... *B01D 46/0004* (2013.01); *B01D 46/0005* (2013.01); *B01D 46/2411* (2013.01); *B01D 2265/027* (2013.01); *B01D 2279/30* (2013.01)

(58) Field of Classification Search
CPC .... B01D 46/2411; B01D 46/71; B01D 46/72; B01D 46/681; B01D 46/0004; B01D 46/0005; B01D 2265/027; B01D 2279/30
See application file for complete search history.

(56) References Cited

U.S. PATENT DOCUMENTS

| 3,958,296 A | 5/1976 | Fell |
| 4,120,671 A * | 10/1978 | Steinmeyer .......... B01D 46/003 55/486 |

(Continued)

FOREIGN PATENT DOCUMENTS

| CA | 2844649 | 10/2016 |
| DE | 3920097 | 2/1990 |

(Continued)

OTHER PUBLICATIONS

Dry-Element Air Cleaners, www.tpub.com, Integrated Publishing, http://enginemechanics.tpub.com/14081/css/Dry-Element-Air-Cleaners-38.htm.

(Continued)

*Primary Examiner* — Robert Clemente
(74) *Attorney, Agent, or Firm* — Alexander Pokot; AP Patents

(57) ABSTRACT

A filter housing includes a first end, an opposite second end and a peripheral side wall, all defining, in a combination with each other, a hollow interior of the housing. An air inlet is provided adjacent the first end and an air outlet is provided in the second end. The air inlet and air outlet are in open communication with the hollow interior. One or more openings are provided through the second end, being disposed between the air outlet and the peripheral side wall. A filter cleaning apparatus includes the filter housing, a hollow filter within the hollow interior and a nozzle within the hollow filter. The nozzle is designed to purge contaminates from the filter with pressurized fluid supply. The contaminates can be removed through one or more openings. The apparatus can be used as an air intake pre-cleaner or as a main air filter for internal combustion engine.

24 Claims, 24 Drawing Sheets

(56) References Cited

U.S. PATENT DOCUMENTS

| | | | |
|---|---|---|---|
| 4,377,401 A | 3/1983 | Laughlin | |
| 4,802,983 A | 2/1989 | Howeth | |
| 4,810,270 A | 3/1989 | Terry et al. | |
| 4,826,512 A | 5/1989 | Fuller | |
| 5,078,763 A | 1/1992 | Blount-Gillette | |
| 5,182,832 A | 2/1993 | McMahon | |
| 5,228,993 A | 7/1993 | Drori | |
| 5,565,012 A * | 10/1996 | Buodd | B01D 46/521 15/352 |
| 5,571,298 A * | 11/1996 | Buck | F01N 3/0212 422/174 |
| 5,584,900 A | 12/1996 | Zaiser et al. | |
| 6,280,491 B1 | 8/2001 | Oke | |
| 6,283,305 B1 | 9/2001 | Maeda | |
| 6,368,390 B1 | 4/2002 | Bitner et al. | |
| 6,588,057 B2 | 7/2003 | McMahon | |
| 7,815,701 B2 | 10/2010 | Grieve | |
| 8,236,076 B2 | 8/2012 | Grieve | |
| 8,668,782 B2 | 3/2014 | Grieve | |
| 9,254,457 B2 | 2/2016 | Kaufmann et al. | |
| 9,273,648 B2 | 3/2016 | Link et al. | |
| 9,309,841 B2 | 4/2016 | Troxell et al. | |
| 9,480,941 B2 | 11/2016 | Grieve | |
| 9,718,015 B2 | 8/2017 | Grieve | |
| 9,803,598 B2 | 10/2017 | Clayton | |
| 9,856,834 B2 | 1/2018 | Rosenfeld | |
| 10,233,877 B2 | 3/2019 | Heck et al. | |
| 10,343,090 B2 | 7/2019 | Morris et al. | |
| 10,413,855 B2 | 9/2019 | Nelson et al. | |
| 10,543,443 B2 * | 1/2020 | Hoff | B08B 5/04 |
| 10,576,403 B2 | 3/2020 | Osendorf et al. | |
| 2007/0251199 A1 * | 11/2007 | Valentini | B23Q 11/0046 55/418 |
| 2011/0072769 A1 | 3/2011 | Vladaj et al. | |
| 2015/0176545 A1 | 6/2015 | Troxell et al. | |
| 2015/0343359 A1 * | 12/2015 | Neef | B01D 46/2411 55/495 |
| 2017/0002705 A1 * | 1/2017 | Grein | B01D 46/003 |
| 2019/0282944 A1 | 9/2019 | Loehl et al. | |
| 2021/0197111 A1 * | 7/2021 | Zhang | B01D 45/14 |
| 2021/0246852 A1 * | 8/2021 | Schmid | F01N 3/32 |

FOREIGN PATENT DOCUMENTS

| | | |
|---|---|---|
| EP | 2027905 | 2/2009 |
| WO | 2019238213 | 12/2019 |

OTHER PUBLICATIONS

Application and Installation Guide Air Intake Systems, www.cat.com/power-systems.

Cat Turbine Precleaner, www.cat.com/parts/precleaner.

* cited by examiner

FILTERING MEDIUM CLEANING APPARATUS AND METHOD

CROSS-REFERENCE TO RELATED APPLICATIONS

This present nonprovisional application claims benefit of and priority from U.S. Provisional Patent Application Ser. No. 62/866,687 filed on Jun. 26, 2019 and from U.S. Provisional Patent Application Ser. No. 63/010,289 filed on Apr. 15, 2020, the entire contents of which are hereby incorporated by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to cleaning of filtering medium being installed in its operating environment. The subject matter may further relate to precleaning air supply to filters being generally provided to filter air for combustion.

BRIEF DESCRIPTION OF THE DRAWINGS

The accompanying drawings are incorporated in and constitute part of the specification and illustrate various embodiments. In the drawings.

DETAILED DESCRIPTION

Figure 1:
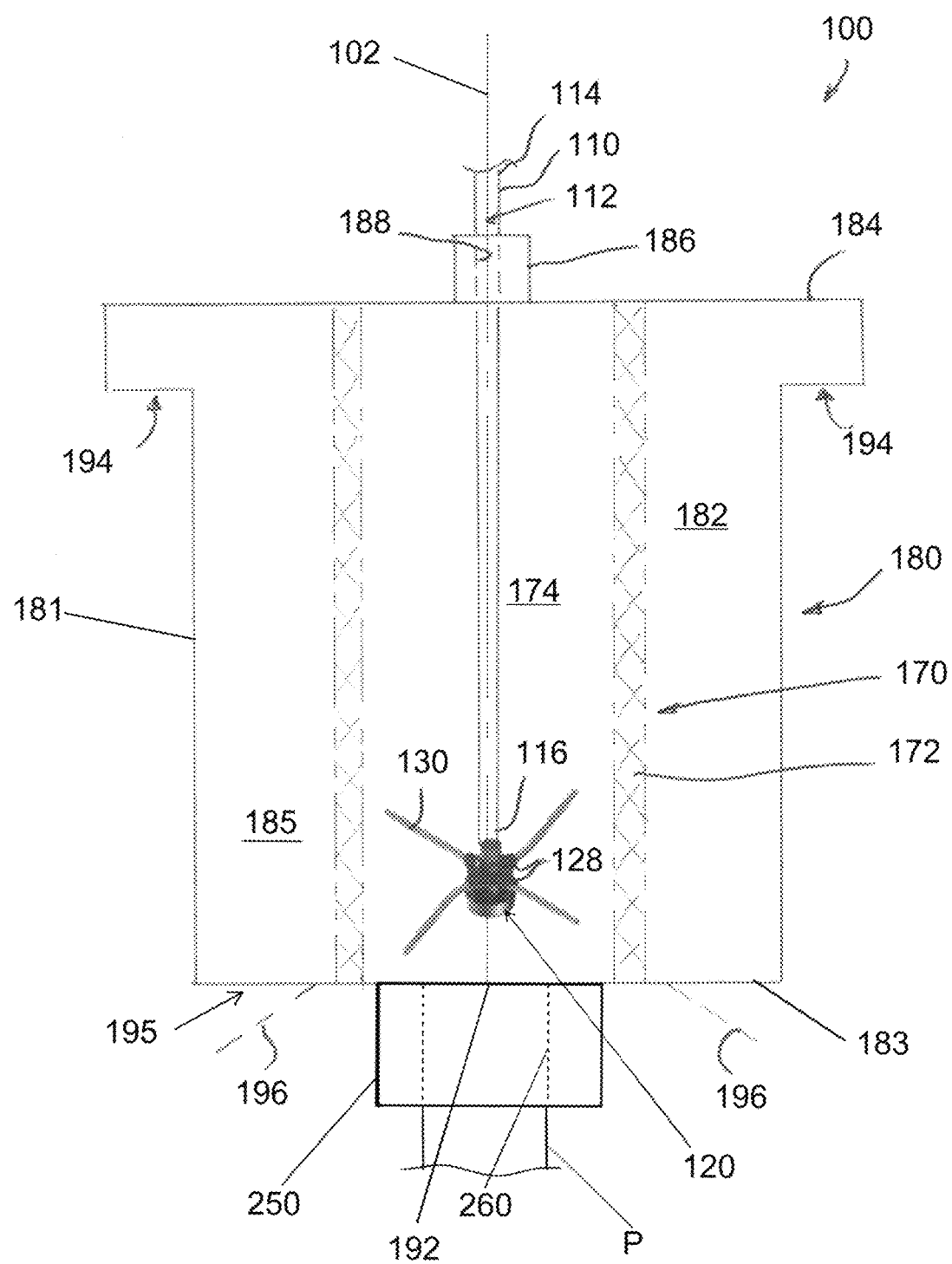
FIG. 1 illustrates an outline view of a filtering medium cleaning apparatus.

Prior to proceeding to the more detailed description of the present subject matter, it should be noted that, for the sake of clarity and understanding, identical components which have identical functions have been identified with identical reference numerals throughout the several views illustrated in the drawing figures.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Anywhere the term "comprising" is used, embodiments and components "consisting essentially of" and "consisting of" are expressly disclosed and described herein."

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

It is to be understood that the singular forms "a," "an," and "the" include plural referents unless the context clearly dictates otherwise. Thus, for example, reference to "a component surface" includes reference to one or more of such surfaces.

The verb "may" is used to designate optionality/noncompulsoriness. In other words, something that "may" can, but need not. In the present disclosure, the verb "comprise" may be understood in the sense of including.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples that may be provided in the present disclosure.

Before elucidating the subject matter shown in the Figures, the present disclosure will be first described in general terms.

General Description

The present disclosure teaches a housing. The housing can be used with an apparatus designed to at least preclean supply of intake air to filters being generally provided to filter air for combustion in internal combustion engines.

The housing can be used with an apparatus designed to filter air supply for combustion in internal combustion engines.

The housing comprises a first end, an opposite second end and a peripheral side wall, the peripheral side wall defining, in a combination with the first and second ends, a hollow interior of the housing. An aperture is provided through the peripheral side wall adjacent the first end of the housing or through the first end. Another aperture is provided through the second end of the housing. These apertures connect the hollow interior with an environment external to the housing. An opening is provided through the first end. When used with the apparatus designed to at least preclean supply of intake air, the aperture through the peripheral side wall adjacent the first end of the housing or through the first end provides an air inlet and the aperture through the second end of the housing provides an air outlet.

The housing may comprise one or more openings through the wall thickness of the housing. The one or more openings are provided in a communication with the hollow interior. The one or more openings may be selectively closed and open with a cover. The cover may be in a hinged connection with the housing.

The housing may comprise a receptacle on the first end. The receptacle may be provided on an exterior surface of the first end. The receptacle may be provided on an interior surface of the first end. The receptacle may be centered on such first end. When provided, the receptacle is aligned with the opening through the first end. The receptacle is described in more details below.

The housing may be provided as a one-piece construction. The housing may be provided as a two-piece construction, where the two pieces are attached to each other, either permanently or detachably. Detachable attachment can be, without limitations, any one of clasps, fasteners, friction fit, hook and loop fastener, releaseable type adhesive, interlocking tabs and the like. When the housing is used with an apparatus designed to at least preclean supply of intake air to filters, one opening can be an air inlet and another opening can be an air outlet. The air inlet may be position adjacent one end of the housing and the air outlet may be positioned adjacent an opposite end of the housing. The air inlet may be provided as one or more aperture through a peripheral side wall thickness of the housing. The air outlet is sized and shaped to be attached to an air intake of the work vehicle.

The present disclosure teaches an apparatus designed to at least preclean supply of intake air to filters being generally provided to filter air for combustion in internal combustion engines. The present disclosure teaches an apparatus designed to filter air supply for combustion in internal combustion engines. In other words, the present disclosure teaches an in situ filter cleaning apparatus. The internal combustion engines may be used on work vehicles. Filters contain a filtering medium. Typically, a supply of air contains contaminants such as dust and debris. The contaminants are accumulated on a surface of the filtering medium and penetrate the thickness of the filtering medium. Eventually, the filtering medium on work vehicles may get clogged. Clogged filtering medium reduces the rate of air flow to the engine, affecting operation of the engine. Many clogged filters are replaced to obviate the problem of inadequate rate of air flow. However, these filters are expensive and may need to be replaced often in heavy use. The apparatus is designed to filter not only the large particles, for example such as corn husk leaves but also fine contaminants such as dust particles.

The apparatus comprises a housing. The housing may be provided as a one-piece construction. The housing may be provided as a two-piece construction, where the two pieces are attached to each other, either permanently or detachably. Detachable attachment can be, without limitations, any one of clasps, fasteners, friction fit, hook and loop fastener, adhesive and the like. The housing has an air inlet and an air outlet. The air inlet may be position adjacent one end of the housing and the air outlet may be positioned adjacent an opposite end of the housing. The air inlet may be provided as one or more aperture through a peripheral side wall thickness of the housing. The air inlet may be provided as one or more aperture through an end wall thickness of the housing. The air outlet is sized and shaped to be attached to an air intake of the work vehicle. The housing also comprises a hollow interior. A filter is positioned within the hollow interior. The filter comprises a filtering medium that divides the hollow interior of the housing into two hollow interior portions. One hollow interior portion is defined by an interior surface of the filtering medium. This hollow interior portion can be referred to as a hollow interior of the filtering medium. The peripheral exterior surface of the filtering medium is disposed at a distance from an interior surface of the housing. Thus, another hollow interior portion is formed between the peripheral exterior surface of the filtering medium and the interior surface of the housing. This another hollow interior portion can be referred to as a chamber between the peripheral exterior surface of the filtering medium and the interior surface of the housing. In other words, the chamber surrounds the exterior surface of the filtering medium. The air flow from the air inlet first passes through the chamber and then drawn, by a suction of the operating internal combustion engine, through the filtering medium into the hollow interior of the filtering medium before exiting the apparatus through the air outlet. A conduit is at least partially mounted within the hollow interior of the filtering medium. The conduit may be stationary mounted within the hollow interior of the filtering medium and span the entire length or height of the filtering medium between ends thereof. The conduit may be mounted for a rotational movement within the hollow interior of the filtering medium. The conduit may be mounted for a both a rotational movement and a reciprocal linear movement within the hollow interior of the filtering medium. The conduit comprises another hollow interior that is connected to a source of air under pressure.

A vent may be positioned within the hollow interior of the filtering medium. The vent is provided as an aperture through a wall thickness of the conduit in a fluid communication with a hollow interior of the conduit. More than one vent may be disposed along a length of the conduit. During operation, the fluid under pressure is communicated through the hollow interior of the conduit to the vent. The fluid under pressure is further communicated through the vent onto the interior surface of the filtering medium so as to expel or purge contaminants from the filtering medium into the chamber. Thus, the chamber can be also referred to as an accumulation chamber for purged contaminants. Fluid may be an air.

A nozzle may be positioned within the hollow interior of the filtering medium. The nozzle is attached to the conduit and is being in open communication with the hollow interior of the conduit. During operation, the fluid under pressure is communicated through the hollow interior of the conduit to the vent or nozzle. When the conduit is stationary mounted, the nozzle may comprise a plurality of nozzles mounted along a length of the conduit and between the ends of the filtering medium. When the conduit is mounted for the rotational movement, the nozzle may comprise a plurality of nozzles. One or more nozzles may be mounted for a rotation relative to a longitudinal axis of the conduit. The longitudinal axis of the conduit may be disposed coaxial with a longitudinal axis of the housing and may be further disposed coaxial with a longitudinal axis of the filtering medium.

The nozzle may be an aperture through a wall thickness of the conduit. In other words, the nozzle may be the vent, as described above. The nozzle may be connected to the conduit with an extension so as to position an end of the nozzle, during use, in a close proximity to the interior surface of the filtering medium.

The nozzle is designed to direct fluid under pressure onto the interior surface of the filtering medium so as to expel or purge contaminants from the filtering medium into the chamber. Thus, the chamber can be also referred to as an accumulation chamber for purged contaminants.

The nozzle may be coupled to a rotor that is in turned coupled to a conduit in a fluid communication with a hollow thereof. The rotor can comprise an irregular internal surface to generate a rotation upon supply of pressurized fluid. The irregular internal surface can be provided by one or more baffles.

The nozzles may be provided without the rotor. The nozzles which comprise a bend at an angle of between about sixty (60) degrees and about hinder twenty (120) degrees may generate a rotation of the conduit due to a reaction of the fluid under pressure with the interior surface of the filtering medium.

The apparatus may comprise a guide to guide the linear movement of the conduit. The guide may be provided as a pair of receptacles being spaced apart from each other along a length of the conduit, where each receptacle comprises a hollow interior sized and shaped to pass the conduit therethrough without binding. The first receptacle from the pair of receptacles can upstand on the flange and the second receptacle from the pair of receptacles can upstand on the interior surface of the end portion. The guide may be provided as a single receptacle comprising a hollow interior sized and shaped to pass the conduit therethrough without binding. The guide may be disposed external to the housing. Externally disposed guide may comprise reinforcing ribs. The guide may be disposed internal to the housing, between one end of the filter and one end of the housing.

When the apparatus comprises internally disposed guide, the housing may be adapted with a seal to seal the end of the filter that is positioned adjacent the air inlet. The seal may comprise a flange that is attached to the guide where the end of the filter will contact a surface of the flange. The flange may have one or more tabs to center the filter within the hollow interior of the housing. The flange may have tabs disposed in a radial pattern relative to an axis of the conduit to accept filters of different sizes. The peripheral edge of the flange may be sized to compliment the size of the interior surface of the housing. This flange will be provided with air passages to allow a passage of the air from the air inlet through the filtering medium. The peripheral edge of the flange may be sized smaller than the size of the interior surface of the housing to provide a peripheral gap with the interior surface of the housing so as to allow the passage of the air from the air inlet through the filtering medium.

The flange may be rigidly attached to the interior surface of the housing adjacent the air inlet. In this arrangement, the guide can be either permanently or detachably attached to the flange.

The flange may be sized and shaped to effectively close one end of the housing. In this arrangement, the guide can be either permanently or detachably attached to the flange and may be considered as being disposed external to the housing.

The seal may comprise an elastomeric material. The elastomeric seal may be connected to the guide and being sized and shaped to receive the end of the filter. The elastomeric seal may be provided as being attached, in a permanent manner, to the one end of the filter and being designed to couple to the guide. The elastomeric seal may be attached to the filter before installation of the filter into the housing. The elastomeric seal may be sized and shaped to center the filter within the hollow interior of the housing when the elastomeric seal is attached to the guide.

When the air inlet is exposed to external environment, the housing may comprise an end portion adjacent the air inlet where the end portion being sized larger than the remaining portion of the housing. Such end portion may have a peripheral edge thereof being sized larger than the peripheral surface of a housing wall. Such enlarged end portion is design to at least prevent moisture infiltration with the air being drawn into the filter through the air inlet. The enlarged end may have a convex and/or a slopped peripheral surface so as to facilitate moisture removal from the top end of the apparatus when the apparatus is installed on the work vehicle.

The enlarged end portion may also incorporate the above described guide into a one-piece integrated end member. When the housing is provided as a two-piece construction, the enlarged end with the guide may be provided as one piece of such two-piece construction.

When the air inlet is exposed to external environment, the apparatus may comprise a canopy to protect the air inlet from environmental elements, such as snow and rain. This canopy may be provided as a separate member. The canopy may have a convex and/or a slopped peripheral surface. The canopy may comprise the guide as described above. The guide can be designed to attach the canopy to the housing. In other words, the apparatus when assembled for use may comprise a housing with more than two portions.

The apparatus may comprise a contaminant evacuation member.

Such contaminant evacuation member may comprise one or more openings through a wall thickness of the housing to evacuate purged contaminants to an environment external to the housing. The one or more openings are provided in a communication with the chamber. The one or more openings may be selectively closed and open with a cover. The cover may be in a hinged connection with the housing. The cover may be in a pivotal connection with the housing. The one or more openings may be selectively closed and open with a damper. The damper may be controlled with an actuator.

The contaminant evacuation member may comprise a valve that is operable to purge contaminants external to the housing due to a pressure differential. The valve may be disposed within a wall of the housing. The valve arrangement includes a frame, a blocking element mounted for reciprocation in a relation to the frame and a biasing element for urging the blocking element into a closed position.

When the conduit is mounted for the linear reciprocal motion, the conduit can be moved manually by a user. The user can be an operator of the work vehicle. When the conduit is mounted for the linear reciprocal motion, the apparatus may comprise a powered actuator device designed to generate such reciprocal linear motor. The powered actuator device may comprise a driving wheel in a frictional engagement with the conduit, a driven wheel in a frictional engagement with the conduit and an actuator coupled to the driving wheel. The actuator can be designed as any one of an electric actuator, a hydraulic actuator and a pneumatic actuator. The actuator is further connected to a control switch inside n operating cab of the work vehicle. When the work vehicle comprises a controller, the controller can be designed to control supply of air under pressure and the linear reciprocal motion. The controller can be designed to operate the apparatus in any one of a preset time interval and a user input.

The apparatus may comprise one or more sensors positioned and connected so as to control operation of the nozzle and, more particularly, control operation of the flow of the air under pressure through the nozzle. A sensor may be positioned downstream of the filter to generate an output signal when air flow pressure is at or below a set value. One sensor may be positioned downstream of the filter and another sensor may be positioned upstream of the filter to generate an output signal when a difference in air flow pressure between the sensors is at or below a set value. The sensor can be installed adjacent the air outlet of the prefilter to generate an output signal when air flow pressure existing the prefilter is at or below a set value. Particularly when the sensor is provided as a component of the apparatus, the apparatus may comprise a control module. The control module comprises a circuit designed to receive signal(s) from the sensor and at least communicate the signal(s) to a work vehicle controller. The control module may comprise a processing device and a computer readable non-transitory storage medium that, when placed in operable relation to the processing device, provides software to effect receipt of the signal(s) and at least a communication of the signal(s) to the work vehicle controller. The processing device may comprise one or more processors.

The apparatus, as described above, can be configured to replace intake air housing on off-road machines employing diesel engines so as to pre-clean intake air prior to supplying the cleaned intake air to main and secondary DPFs of the diesel engine.

The apparatus, as described above, can be also configured to be installed so as to function as the primary engine filter.

The conduit with the nozzle(s) does not have to be present during regular operation of the vehicle. In other words, the apparatus can be installed without the conduit with the nozzle(s) and one end can be adapted with a center aperture (plugged during normal operation) to receive the conduit with the nozzle(s) only during cleaning operation or the end can be provided as a removable/detachable lid to expose the end of the housing for use by the conduit with the nozzle(s) with its own mounting member to temporarily close such open end. In other words, the air intake of the vehicle can be modified to house the above described filtering medium and to periodically receive the conduit with the nozzle(s) during cleaning operation.

The present disclosure also teaches a method of in situ precleaning supply of air to filters being generally provided to filter air for combustion in internal combustion engines. The method comprises installing a prefilter apparatus upstream of a main filter. The method may comprise installing the prefilter apparatus external to an engine compartment of the work vehicle. The method also comprises passing the air through a filtering medium within the prefilter apparatus prior to allowing the air to reach the filter of the internal combustion engine. The method also comprises passing pressurized fluid flow through a nozzle mounted within the hollow interior of a filtering medium. The method may comprise guiding, with a guide, a linear and a rotational movement of the nozzle to purge contaminants from a filtering medium within a housing of the prefilter apparatus into a collection chamber. The collection chamber is provided between the exterior surface of the filtering medium and an interior surface of the housing. The method further comprises removing the purged contaminants from the collection chamber. Removing the purged contaminants may comprise detaching the apparatus from the work vehicle and gaining access to the interior of the housing. Removing the purged contaminants may comprise exposing a covered opening and allowing purged contaminants to exit the accumulation chamber under gravity. Removing the purged contaminants may comprise exposing a covered opening and removing purged contaminants from the accumulation chamber with a suction device. Removing the purged contaminants may comprise manually exposing the covered opening.

The present disclosure also teaches an apparatus designed to at least preclean air supplied to diesel particulate filter (DPF).

DPF are currently being used in diesel engine exhaust systems to trap diesel particulate matter (DPM) as exhaust flows through the exhaust system from the engine, thereby preventing the trapped matter from entering the atmosphere.

Equipment that has been designed specifically for cleaning DPF's is commercially available. Generally, a DPF to be cleaned is placed in a cleaning machine with the DPF outlet, from which engine exhaust exits the DPF, coupled to a source of compressed air and with the DPF inlet, through which exhaust enters the DPF, coupled to a particulate collector. Compressed air is delivered to the outlet face of the DPF substrate in a succession of air pulses having sufficient pressure to force the air through passages in the substrate. The pulsing dislodges particulate matter from surfaces of the substrate along the passages. The dislodged particulate matter entrains with the flow of air through the substrate and is conveyed out of the substrate through the substrate's inlet face, leaving the DPF inlet and passing into the collector. Collector generally contains a filter configured to collect DPM dislodged from DPF's substrate. Such filter must be removed from the collector's interior and either replaced with a new filter or cleaned for subsequent reuse. However, environmental regulations require containment of particulate matter dislodged from the substrate of the filter. In other words, such filter may not be simply cleaned in an open environment with dislodging particulate matter into air.

Off-road vehicles using diesel engines generally have an external air intake module with a filter that is configured to pre-clean the air intake and prevent large particles from reaching the primary and secondary (when applicable) DPF(s) disposed inside the engine. Such filter, even if being effective to sufficiently pre-clean the intake air, must be periodically replaced or remotely cleaned. Furthermore, additional improvements are needed in supplying cleaner air to DPF(s).

The present disclosure also teaches cleaning a filtering medium with a hollow interior without removal of such filtering medium from its operating environment. In other words, the present disclosure teaches cleaning a filtering medium in situ and, therefore, without a need to remove such filtering medium for cleaning remotely from the operating environment. During cleaning, the contaminants trapped in the filtering medium is dislodged from such filtering medium for further collection and disposal.

The present disclosure also teaches an apparatus designed to clean filters employed in powder paint booths. Products to be painted by way of powder paint formulation may be manually positioned within a booth having a hollow housing or may be conveyed therethrough. In either operational mode, an electrostatic spray gun or guns receive paint particles in powdered form from a feed hopper and dispense them into the spray booth against the product to be painted. Not all of the powdered particles adhere to the product. Those not adhering are captured by a forced air flowing through the spray booth to a filtering medium (filter or filter) that comprises substrate configured to capture (trap) particles. One or more filters may be installed vertically in the hollow interior of the spray boot housing. From time to time the particles are vibrated off the filtering medium and fall into a fluidized bed hopper at the bottom of the filter. Hoses are provided for conveying the particles back to the feed hopper.

In some powder spray booths, filters may be combined into a filter module that can be detachably attached to the spray booth housing. For example, the filter module may be mounted on wheels so that it can be rolled into position adjacent an air plenum having a blower which creates the necessary air flow. In some filter modules, the filters may be installed horizontally.

In either example of the powder paint booth, the filters must be removed and cleaned remotely and external to the powder paint booth thus incurring greater than desirable maintenance costs and process delays.

Now in a further reference to the Figures.

FIG. 1 illustrates an apparatus 100 configured to clean filtering medium with a hollow interior.

The apparatus 100 comprises a conduit 110, having a hollow interior 112 communicating a pressurized fluid flow therethrough from a connector 118 coupled to an end 114 and defining a longitudinal axis 102 of the apparatus 100, the conduit 110 being mounted for a reciprocal linear movement along the longitudinal axis 102.

A rotor 120 is mounted for a rotation about the longitudinal axis 102 at an end 116 of the conduit 110. The rotor 120 is disposed in series and coaxially therewith along the longitudinal axis 102. The rotor 120 has a hollow interior disposed in a fluid communication with the hollow interior 112 of the conduit 110 and being configured to receive the pressurized fluid flow therefrom. The rotor 120 may have an internal irregular surface generating a rotation of said body about the conduit 110 during communication of the fluid pressure through the hollow interior 112 thereof. The irregular surface can be provided by a chamber with baffles configured to receive fluid pressure from internal port(s) within the rotor 120. The rotor 120 has one or more ports 128 communicating pressurized fluid flow external to the rotor 120. The port 128 can be provided as an aperture through a wall thickness of the rotor 120.

One or more nozzles 130 may be attached to the rotor 120 for a rotation therewith and for the reciprocal linear movement with the conduit 110 and in an open communication with the hollow interior 112, wherein a free end of the one or more nozzles 130 can be positioned in a proximity to an interior surface of the filtering medium during use of the apparatus 100. Each nozzle 130 is mounted to the rotor 120 in a fluid communication with a respective port 128.

The one or more nozzles 130 are thus mounted in a fluid communication with the hollow interior 112 of the elongated conduit 110, for a rotation thereabout, whereby the one or more nozzles 130 are operable to deliver the pressurized fluid flow to an interior surface of the filtering medium 172 when the hollow interior 112 of the conduit 110 is connected to a source of the pressurized fluid flow. The one or more nozzles 130 extend outwardly relative to the conduit 110, in a plane being generally normal to the longitudinal axis 102. The nozzles 130 do not have to be of the same length. Longer length nozzles 130A and shorter length nozzles 130B may be provided. The rotor 120 can be sized so that the port(s) 128 would be disposed, during use, in a proximity to an interior surface of the filtering medium 172, thus eliminating the need for nozzle(s) 130.

The apparatus 100 can also comprise a housing 180. The housing 180 can be also referred to as a casing. The housing 180 comprises a peripheral side wall 181 and a hollow interior 182 sized and shaped to receive the filter 170 with a filtering medium 172 and a hollow interior 174. When the filter 170 is positioned within the hollow interior 182, the filter divides such hollow interior 182 into two hollow portions. The first hollow portion is illustrated as the hollow interior 174 within the filter 170. The other hollow portion is referenced with reference numeral 185 and forms the above described chamber between the exterior surface of the filtering medium 172 and interior surface of the housing 180.

One end of the housing 180, for example such as end 184 is configured to receive the conduit 110 therethrough. The housing 180 comprises an air outlet 192 through an axially opposite end 183. The air outlet 192 is aligned with the hollow interior 174 and is being configured to deliver air filtered through the filtering medium 172 of the filter 170.

The housing 180 also comprises air inlet 194. The air inlet can be also referred to as an intake port 194. The air intake port(s) 194 is(are) positioned so as to deliver air into the hollow interior 182 where such air can be only passed through the substrate of the filtering medium 172 prior to exiting the air outlet 192. One or more covers or trap doors 196 can be provided in the housing 180 to selectively open and close opening(s) 195 through the axially opposite end 183. During use of the apparatus 100, the opening(s) 195 are designed to remove particulate matter dislodged from the substrate of the filtering medium 172.

The end 184 may comprise a receptacle 186 with a through bore 188. In other words, the receptacle 186 is being provided as a hollow receptacle. The length of the through bore 188 is sufficient to guide linear movement of the conduit 110. The through bore 188 can be sealed to prevent air infiltration therethrough during movement of the conduit 110 therewithin.

In operation for example in a pre-cleaning configuration on a vehicle (not shown), the housing 180 is mounted so that the air outlet 192 is operatively aligned with an air intake P of the vehicle (not shown). The air outlet 192 can be shaped and sized to fit directly onto the air intake P. The housing 180 may be mounted by way of an adapter 250 with an internal bore 260 sized to fit onto an air intake P of the vehicle 800 of FIG. 23. The adapter 250 can comprise an elastomeric material for a friction fit onto an exterior surface of the air intake P or can be attached thereunto by any other means, for example by clamps, adhesive, and the likes. It is also contemplated that the air intake P can be integrated into the apparatus 100 on newly manufactured vehicles. In other words, the present disclosure teaches a vehicle with an internal diesel engine that also comprises the apparatus 100.

The fluid under pressure is coupled to the end 114 that protrudes above the receptacle 186 and that can be grabbed by a user. The conduit 110 is moved linearly within the hollow interior 174 so as to dislodged the particulate matter into the hollow interior 182 of the housing 180. Trap door(s) 196 can be opened to remove the collected particulate matter for further disposal. During normal operation, the air enters the housing 180 through the intake port(s) 194 and exists the housing 180 through the outlet 192 after being passed through the substrate of the filtering medium 172.

The conduit 110 can be prevented from unintended vertical movement during use by any one of a threaded connection, a quick disconnect connection, a quarter turn connection, clamp(s) between the conduit 110 and the abutment 186.

The apparatus 100 can be configured to replace intake air housing on off-road machines employing diesel engines so as to pre-clean intake air prior to supplying the cleaned intake air to main and secondary DPFs of the diesel engine.

The conduit 110 with the nozzle 130 does not have to be present during regular operation of the vehicle. In other words, the apparatus 100 can be installed without the elongated conduit 110 with the nozzle 130 and the end 184 can be adapted with a center aperture (plugged during normal operation) to receive the conduit 110 with the nozzle 130 only during cleaning operation or the end 184 can be provided as a removable/detachable lid to expose the end of the housing for use by the conduit 110 with the nozzle 130 with its own mounting member to temporarily close such open end. In other words, the air intake P can be modified to house the above described filtering medium and to periodically receive the conduit 110 with the nozzle 130 during cleaning operation.

Figure 2:
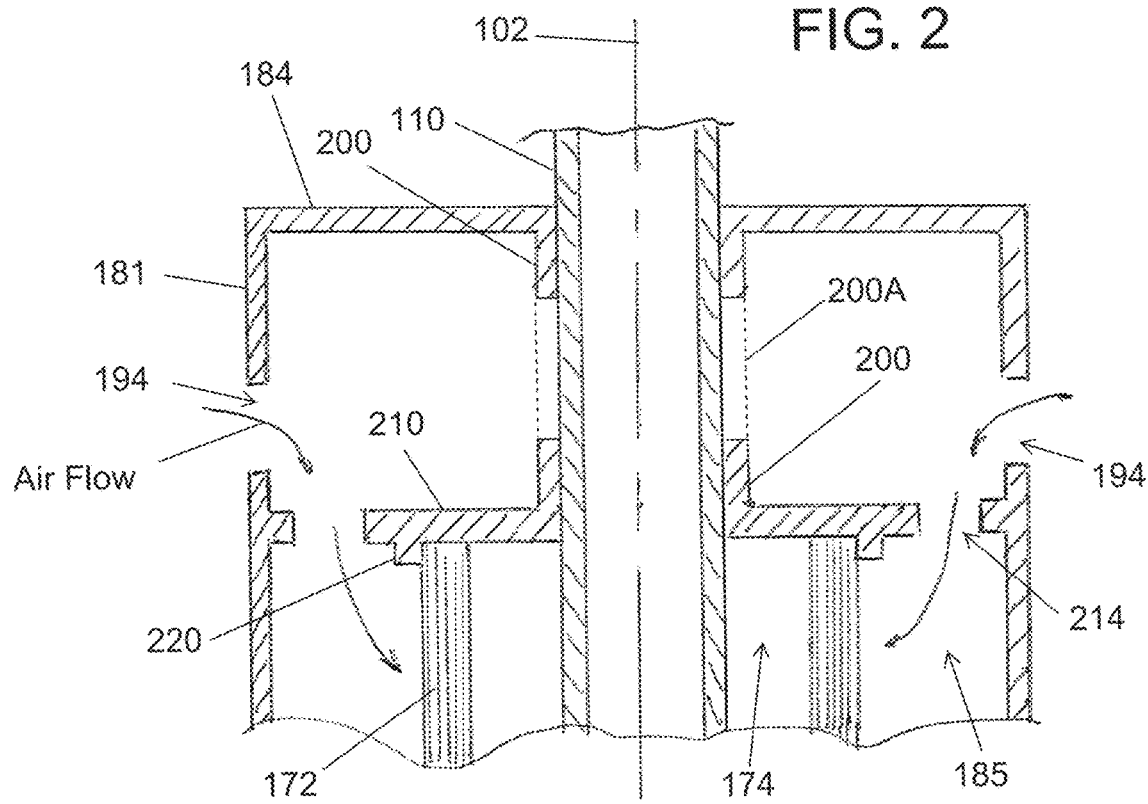
FIG. 2 illustrates a partial cross-sectional elevation view of the filtering medium cleaning apparatus.

FIG. 2 illustrates the housing 180 as described above. The air inlet 194 is illustrated as an aperture through the peripheral side wall 181 of the housing 180. The air inlet 194 can comprise a plurality of apertures through the peripheral side wall 181. The air inlet 194 can also comprise a hollow conduit extending from the peripheral side wall 181 in an open communication with the aperture therewithin. FIG. 2 also illustrates two receptacles 200 that are provided inside the housing 180 to guide movement of the conduit 110. The two receptacles 200 can be provided as a single receptacle 200A. The receptacle 200 is coupled to the flange 210. The flange 210B comprises air passage openings 214. The filtering medium locating tabs are referenced with a numeral 220.

Figure 3:
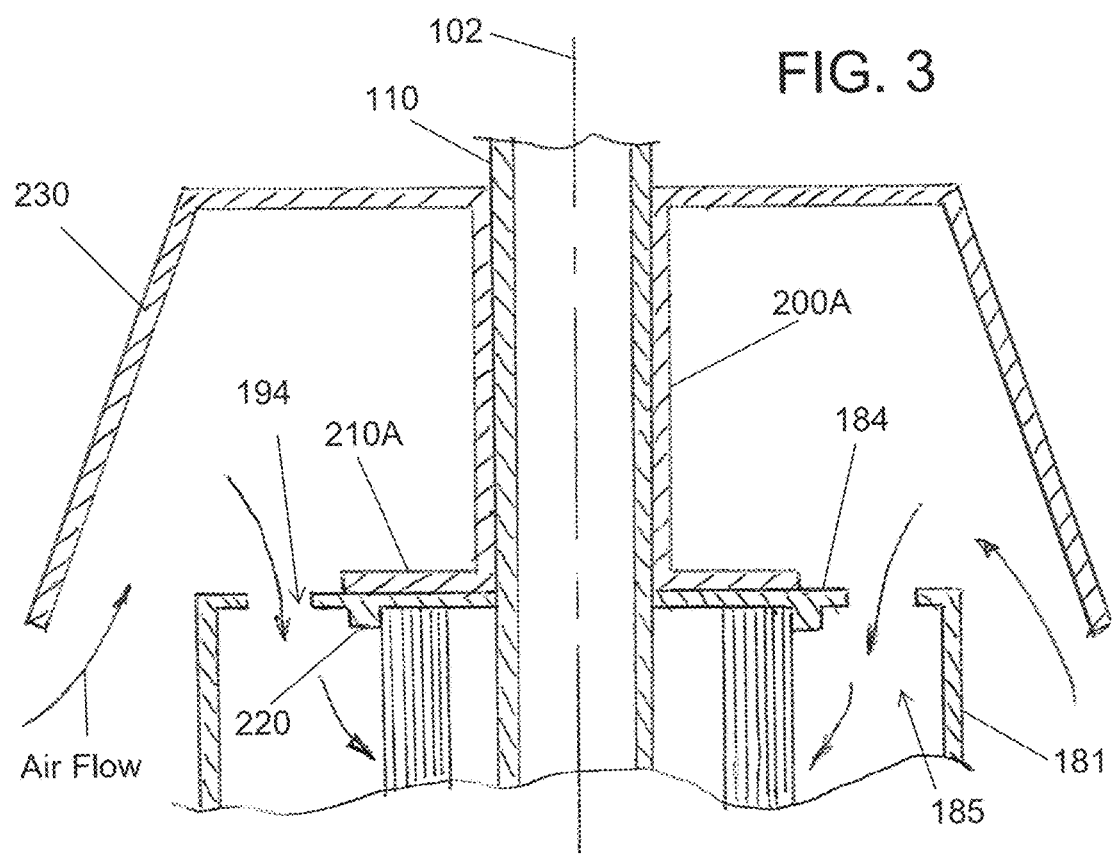
FIG. 3 illustrates a partial cross-sectional elevation view of the filtering medium cleaning apparatus.
Figure 4:
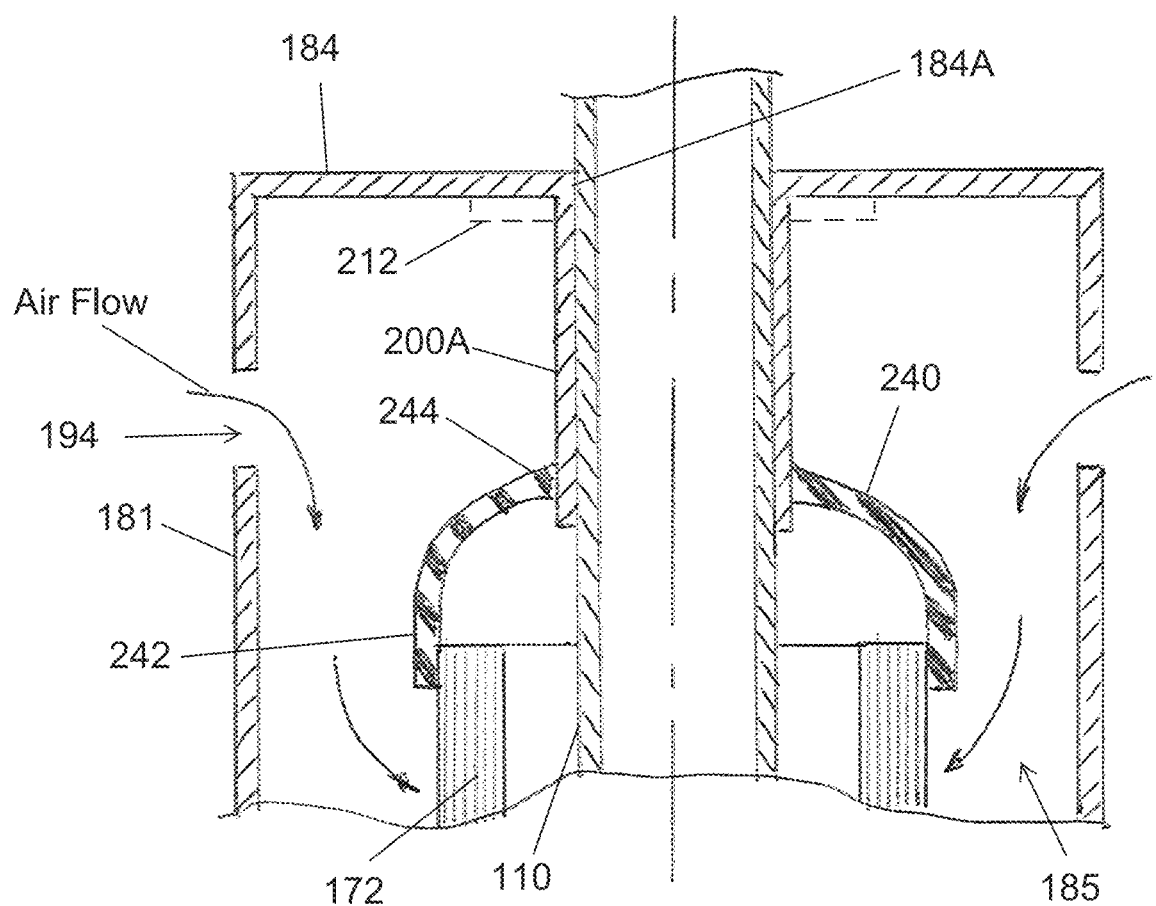
FIG. 4 illustrates a partial cross-sectional elevation view of the filtering medium cleaning apparatus.

FIG. 3 illustrates the housing 180 as described above. The air inlet 194 is illustrated as an aperture through the end 184 of the housing 180. FIG. 3 also illustrates a canopy 230 that shields the air inlet 194. The canopy 230 is illustrated as having a slopped surface. The canopy 230 can be configured with a curved surface. The canopy 230 is illustrated as also comprising a receptacle 200A. Furthermore, receptacle 200A may comprise a flange 210A. The flange 210A, when provided, abuts the end 184. The flange 210A may be permanently or detachably attached to the end 184. The canopy 230 may be directly attached to the end 184 of the housing 180, for example when the air inlet 194 is provided through the side wall FIG. 4 illustrates the housing 180 as described above. The air inlet 194 is illustrated as an aperture through a side wall of the housing 180. FIG. 4 also illustrates an elastomeric seal 240 that both seals one end of the filtering medium 172 at an end 242 and centers the filtering medium 172 within the housing 180 at an end 244. On housings 180, adapted with the internally disposed receptacle 200A, the end 244 of the elastomeric seal 240 may be sized and shaped to attach to the receptacle 200A. On the housing 180, provided without the internally disposed receptacle 200, the end 244 of the elastomeric seal 240 may be attached to the interior surface of the end 184 or may be sized and shaped to fit an aperture 184A in the end 184. In view of the above, the conduit 110 may be mounted in a direct contact with the end 244. In this arrangement, the end 244 may be also configured to seal interface between the conduit 110 and the end 184 of the housing 180

FIG. 4 also illustrates that the receptacle 200 can be provided as a separate member and that can be attached to the housing 180, for example with the flange 212. The flange 212 may be attached permanently, for example by way of a permanent type adhesive or detachably by way of fasteners, releaseable type adhesive and the like arrangements.

Figure 5A:
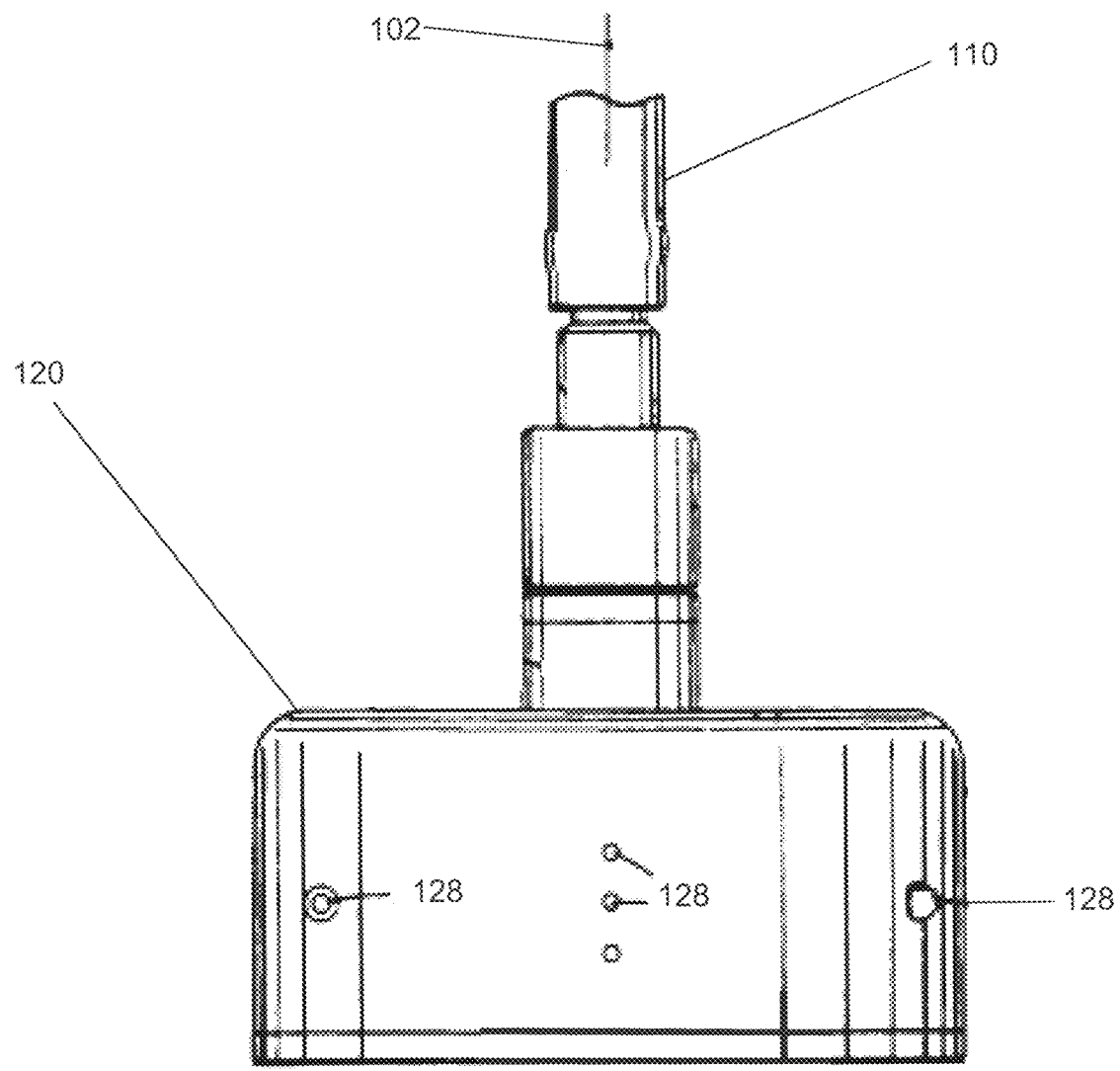
FIG. 5A illustrates an air expelling device that can be employed within the filtering medium cleaning apparatus.

FIG. 5A illustrates an example of the apparatus 100 where the rotor 120 can be only provided with a plurality of outlet ports or vents 128 disposed on a periphery of the rotor 120. This rotor 120 may not rotate about the longitudinal axis.

Figure 5B:
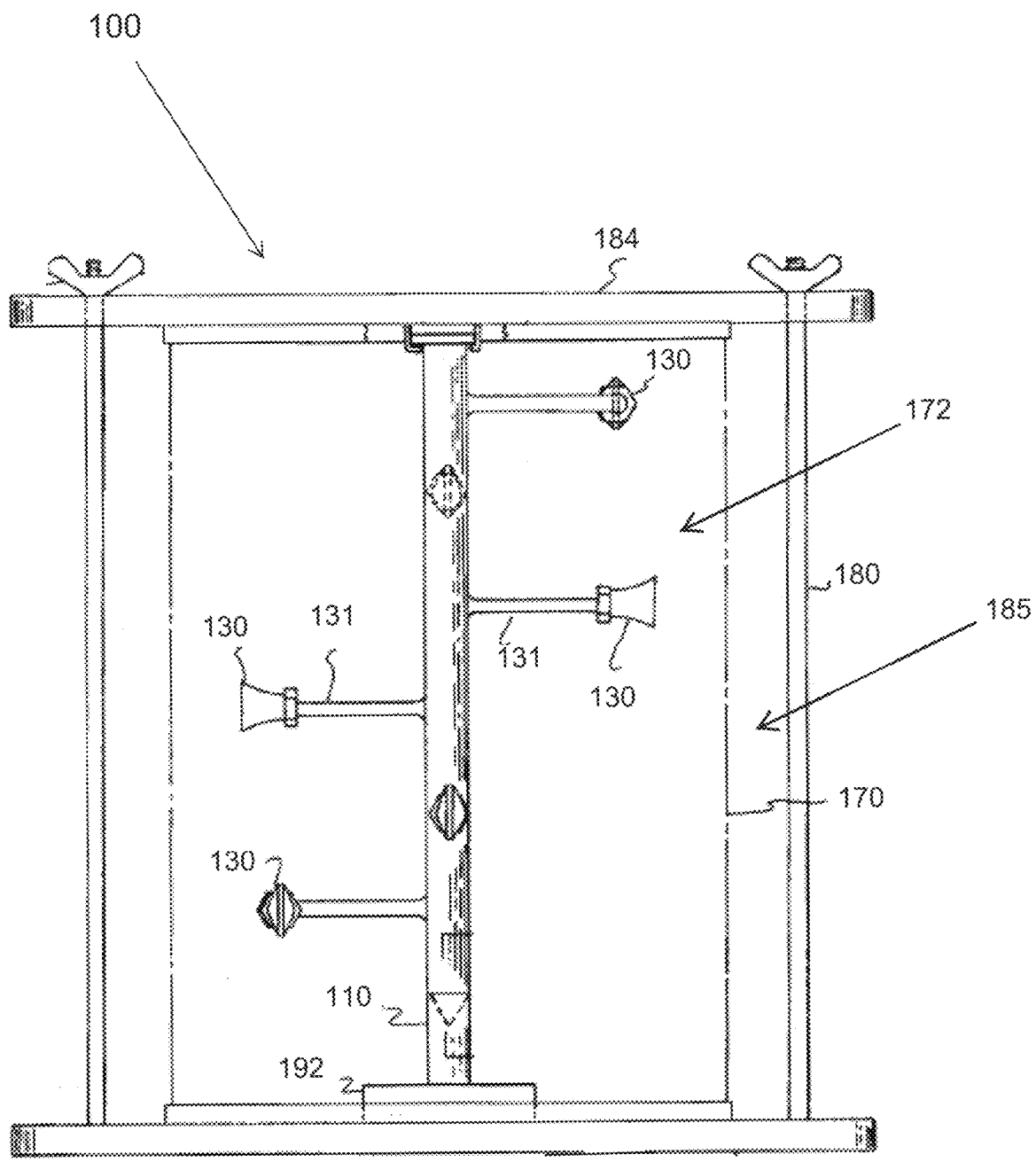
FIG. 5B illustrates an air expelling device that can be employed within the filtering medium cleaning apparatus.

FIG. 5B illustrates an example of the apparatus 100 that can be provided without the rotor 120, where the nozzles 130 are connected to the conduit 110 through extensions 131. The conduit 110 would generally span the length of the filtering medium 170. In this example, the conduit 110 will not be moved linearly and may not be rotated about its longitudinal axis during use.

Figure 5C:
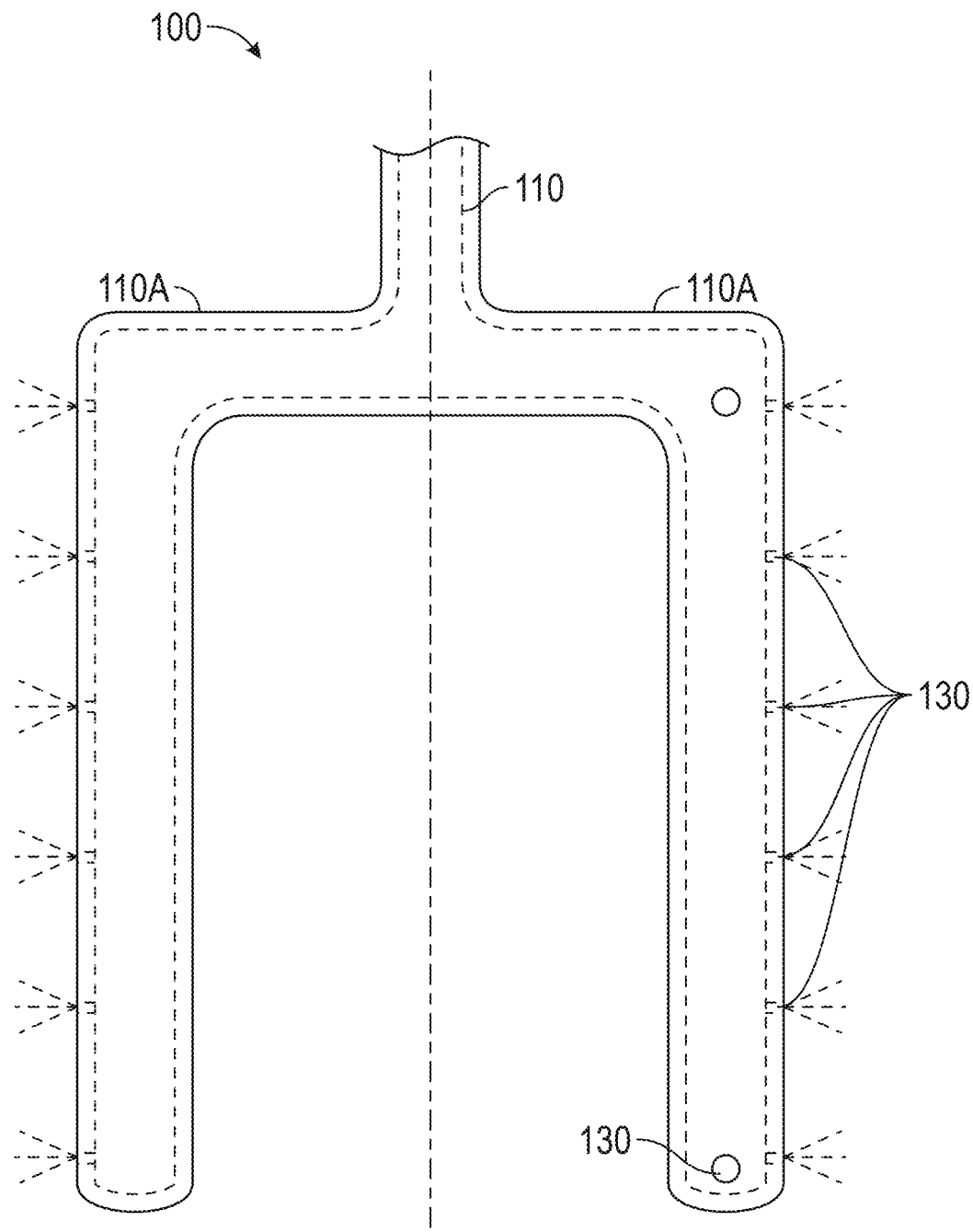
FIG. 5C illustrates an air expelling device that can be employed within the filtering medium cleaning apparatus.

FIG. 5C illustrates an example of the apparatus 100 where the conduit 110 can be adapted with one or more portions 110A that would generally span the length of the filtering medium 170. and where nozzles 130 are simply apertures (ports) in the portions 110A. In this example, the conduit 110 may not be moved linearly and can be rotated during use.

In other words, it is not necessary to rotate the rotor 120 with the nozzles 130 by way of an irregular surfaces within the rotor 120. In this example, the rotor 120 can be simply a member with bore(s) configured to eject the fluid under pressure directly onto the filtering medium or configured to conveniently and easily mount the nozzle(s) 130, for example either by a threaded connection, a friction fit or an adhesive.

Even if rotation is necessary, such rotation can be achieved manually. In other words, a user can both rotate and linearly move the conduit 110 during a cleaning process. Or the rotation can be achieved by way of one or more nozzle 130 with about a 90-degree bend where the ejected fluid under pressure would propel a rotational motion when contacting the interior surface of the filtering medium.

Figure 7:
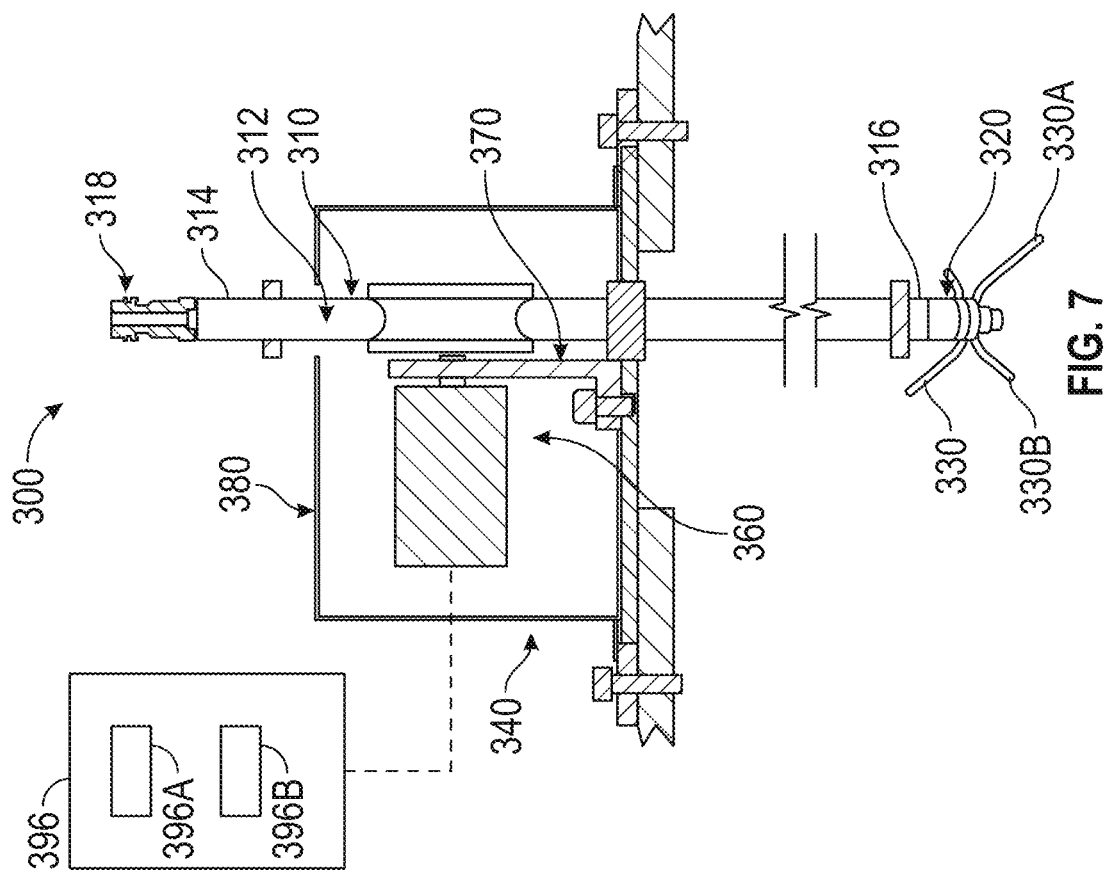
FIG. 7 illustrates a side elevation outline view of the exemplary drive of FIG. 6.
Figure 6:
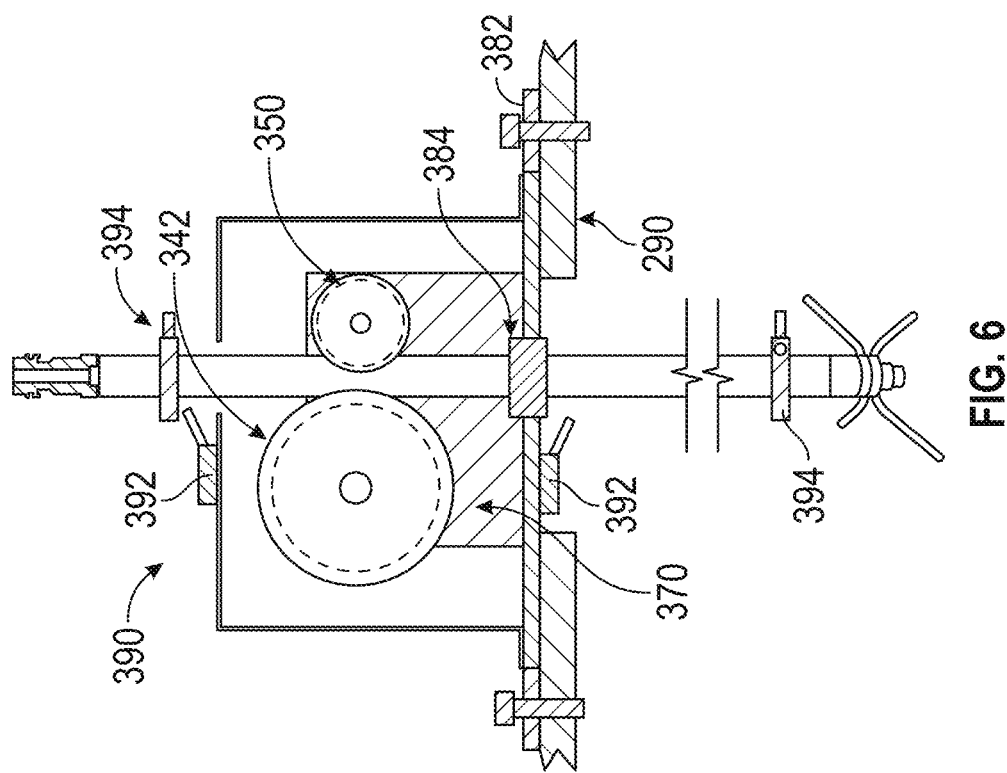
FIG. 6 illustrates an elevation outline view of a drive that can be employed within the filtering medium cleaning apparatus.
Figure 8:
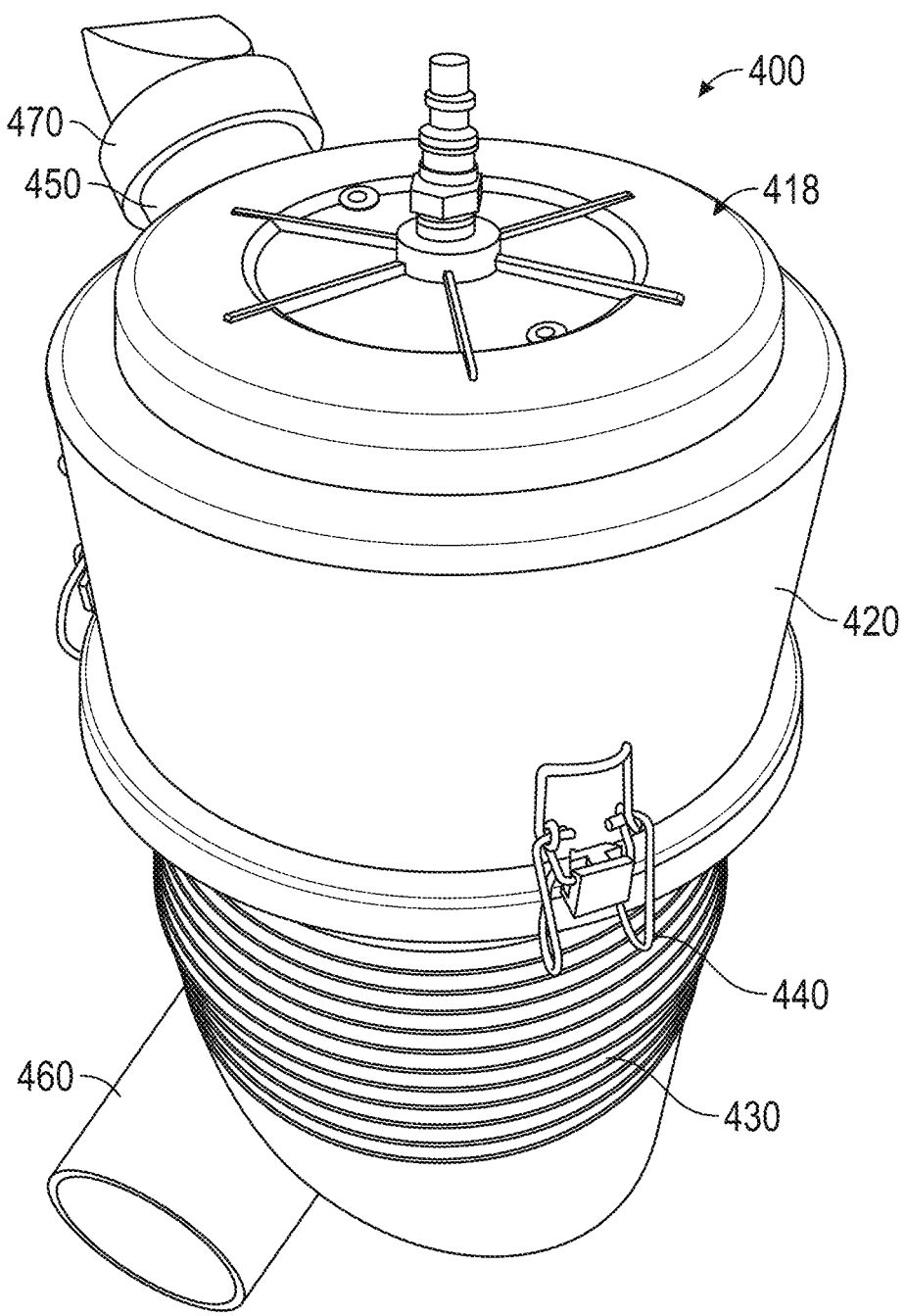
FIG. 8 illustrates a perspective view of a filtering medium cleaning apparatus.
Figure 9:
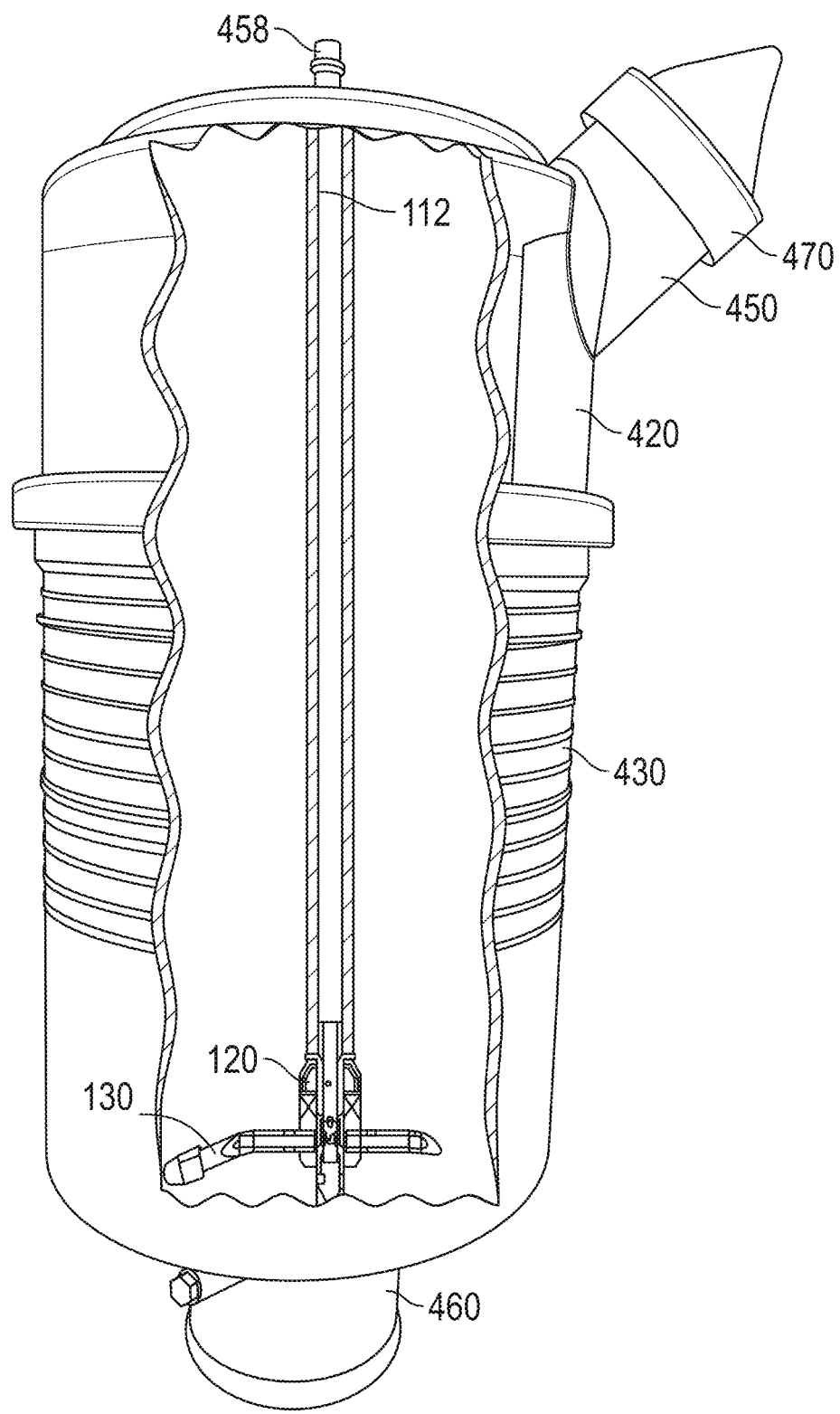
FIG. 9 illustrates an elevation view of the filtering medium cleaning apparatus of FIG. 8.
Figure 10:
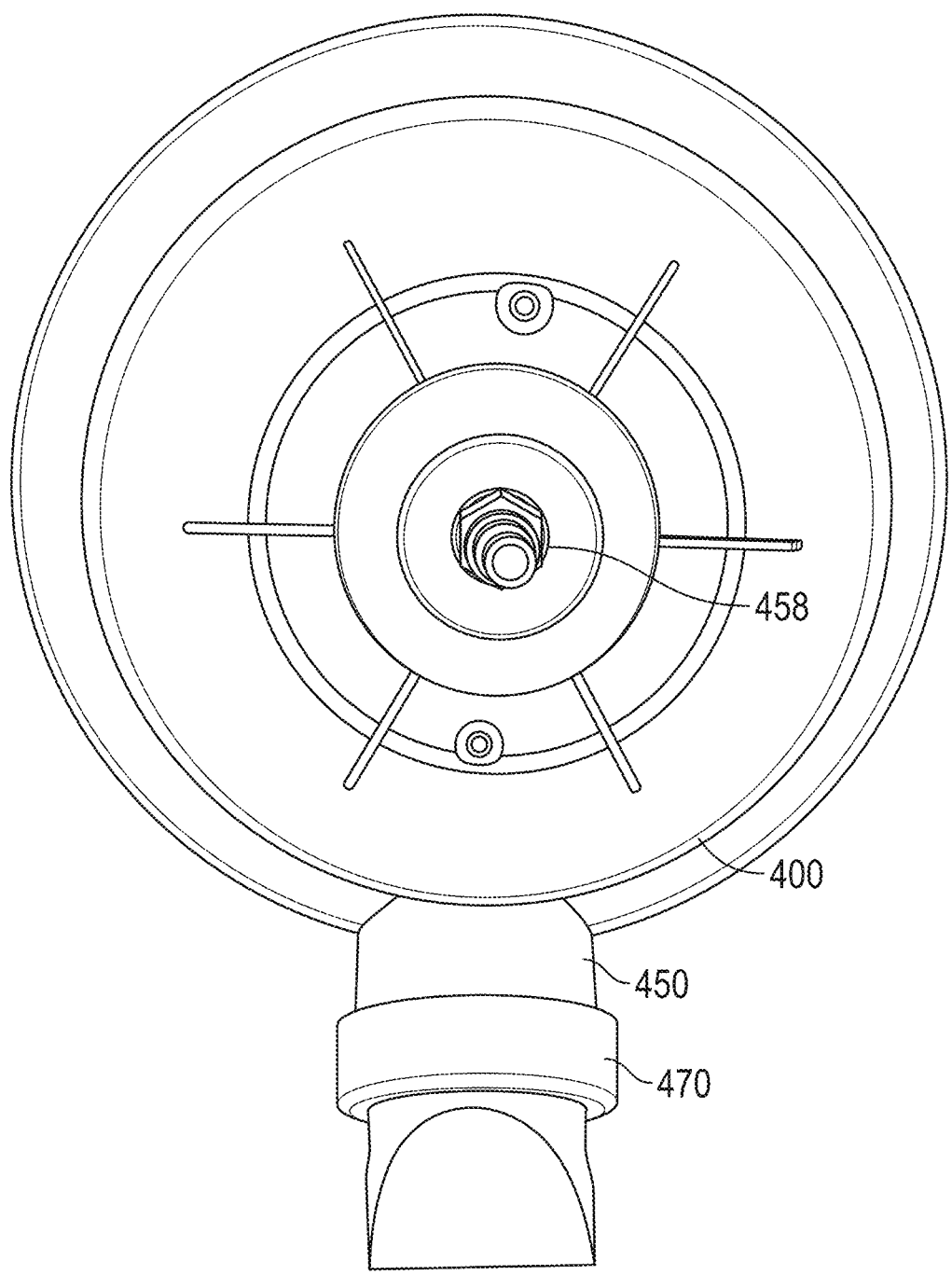
FIG. 10 illustrates an end view of the filtering medium cleaning apparatus of FIG. 8.

FIGS. 6-7 illustrate an apparatus 300 for cleaning filtering medium with a hollow interior. Such apparatus 300 comprises a conduit 310 having a hollow interior 312 communicating a pressurized fluid flow therethrough from a connector 318 coupled to an end 314 and defining a longitudinal axis of the apparatus, the conduit 310 being mounted for a reciprocal linear movement along the longitudinal axis.

The apparatus 300 comprises a rotor 320 mounted for a rotation about the longitudinal axis at an end 316 of the conduit 310 and one or more nozzles 330 are attached to the rotor 320 for the reciprocal linear movement with the conduit 310 and in a fluid communication with the hollow interior 312, wherein a free end of the one or more nozzles 330 can be positioned in a proximity to an interior surface of the filtering medium during use of the apparatus 300. The nozzles 330 do not have to be of the same length and it is contemplated that longer nozzles 330A and shorter nozzles 330B may be provided. In an example, the rotor 120 can be provided with an internal chamber in a fluid communication with the conduit 310 and one or more baffles within the chamber that generate a rotational motion due to the compressed air supply through the conduit 310. In an example, the nozzle(s) can be bent about 90 degrees to generate rotational motion against the interior surface of the filter to be clean.

FIGS. 6-7 illustrate also illustrate a powered actuator device 340 configured to generate the reciprocal linear movement of the conduit 310. The powered actuator device 340 is illustrated in a combination with the apparatus 300 but can be also used in a combination with the apparatus 100, as described above. The powered actuator device 340 comprises a driving member 342 mounted for a rotation in a plane having the conduit 310 being mounted for the reciprocal linear movement, the driving member 342 having a peripheral edge surface thereof positioned in a direct abutting contact with an exterior surface of the conduit 310. The driving member 342 can be mounted for a rotation to a mounting member 370. A prime mover 360, for example, such as an electrically operable motor, is also rigidly coupled to the mounting member 370 and has an output shaft coupled axially to the driving member 342. The motor 360 is operable to rotate the driving member 342 in mutually opposite directions. There is also a driven member 350 mounted for a rotation in the plane and having a peripheral edge surface thereof positioned in a direct abutting contact with an exterior surface of the conduit 310, whereby the edge surface of the driving member 342 and the edge surface of the driven member 350 cage an exterior surface of the conduit 310 therewithin so as to apply force thereto and guide the reciprocal linear movement of the conduit 310. Each of the driving member 342 and driven member 350 is illustrated as a disk shaped member having a pair of spaced apart surfaces defining a thickness thereof and wherein the peripheral edge surface of the each of the driving member 342 and driven member 350 has a concave shape in a plane normal to the pair of spaced apart surfaces.

The powered actuator device 340 can be mounted within a hollow interior of an enclosure (or housing) 380. The enclosure 380 can also comprise a base member 382 that can be secured to a wall of an enclosure containing filtering medium. Such enclosure can be enclosure 902 of FIG. 24. The enclosure 380 can be semi-permanently (detachably) secured with fasteners or may be even permanently (non-detachably) secured by welding or any other suitable method. A seal 384 may be also provided to seal the interface between the conduit 310 and the enclosure.

At least one of the driving member 342 and the driven member 350 may have an axial aperture formed through a thickness thereof, wherein the mounting member 370 has one or more threaded apertures, wherein the apparatus 300 further includes a fastener having a body sized and shaped to be frictionally received within the axial aperture and having a threaded portion extending from one end of the body and being sized to be threadably received within a threaded aperture, and wherein an axis of the threaded portion is offset from an axis of the body.

The mounting member 370 may have one or more threaded apertures, wherein at least one of the driving member 342 and the driven member 350 has a threaded portion extending outwardly from one surface thereof and being sized to be threadably received within a threaded aperture, and wherein an axis of the threaded portion is offset from an axis of the at least one of the driving member 342 and the driven member 350 so as to move a respective peripheral edge surface toward and away from the exterior surface of the conduit 310.

It is also contemplated that at least one of the driving member 342 and the driven member 350 is mounted for a movement toward to and away from the conduit 310 in a direction being normal to the longitudinal axis.

The powered actuator device 340 can be also referred to as a power transmission device that is configured to transmit the rotational shaft power of the motor 360 due to electrical energy coupled to the motor 360 into a reciprocal linear movement of the conduit 310 and, subsequently, the body 320 and the nozzles 330.

The powered actuator device 340 can be also used with the apparatus 100 as described above and other apparatuses, as described below.

The apparatus 300 can also comprise a control member 390, at least controlling the reciprocal linear movement of the conduit 310.

The control member 390 includes a pair of switch actuators 394 and a pair of limit switches 392 spaced apart from each other along the longitudinal axis and in electrical communication with the electrically operable motor 360, each of the pair of the switch actuators secured on the exterior surface of the conduit 310 adjacent one end thereof, wherein each of the pair of limit switches 392 is mounted in a stationary position so as to be actuated or deactuated by a respective switch actuator 394 during the reciprocal linear movement of the conduit 310 and wherein a spacing between the pair of limit switches 392 defines a linear stroke or a linear travel distance of the conduit 310.

The control member 390 may comprise a controller 396 coupled to the electrically operable motor 360. The controller 396 may include a processing device 396A. The processing device 396A may comprise one or more processors. The controller may include a non-transitory computer readable medium 396B comprising executable instructions that, when executed by the processing device 396A, cause the processing device 396A to perform the steps of activating and deactivating the electrically operable motor 360, calculating a stroke or a travel distance of the conduit 310 based on user inputted or preset length of the filtering medium, causing the electrically operable motor 360 to move the conduit 310 along the longitudinal axis so that one or more nozzles 330 travel along a length of the filtering medium (not shown) during the use of the apparatus. The controller 396 can be also provided as a component of a vehicle.

The powered actuator device 340 may be adapted with a second set of the driving member 342, the driven member 350 and the motor 360 but where the driving member 342 and the driven member 350 in such second set are disposed in the plane being perpendicular to the plane of the driving member 342 and the driven member 350 of FIGS. 6-7. The driving member 342 and the driven member 350 in such second set can be mounted to a 90-degree flange (not shown) of the mounting member 370. Thus, in operation, the driving member 342 and the driven member 350 in such second set will generate a rotational motion of the conduit 110 and the nozzle(s) 330 coupled thereto in the fluid communication with the hollow interior 312 thereof.

FIGS. 8-15, illustrate an air filter 400. The air filter 400 comprises a housing 418. The housing 418 can be referred to as a casing. The housing 418 comprises a first portion 420 and a second portion 430. When the self-cleaning filter 400 is installed vertically, the first portion 420 is positioned as an upper portion. When the air filter 400 is installed horizontally, the first portion 420 may be positioned as a right or a left portion. The first portion 420 and the second portion define each of a hollow interior and a peripheral inner surface of the housing 418. A fastener 440 detachably attaches the second portion 430 to the first portion 420. The fastener 440 can be include one or more clasps. A filter 410 is disposed within the hollow interior between an inner end surface of the first portion 420 and an inner end surface of the second portion 430. An outer peripheral surface of the filter 410 is inset from the peripheral inner surface of the housing 418 and defines an open space 402. The filter 410 comprises a filtering medium 412. The filtering medium 412 is disposed between the inner peripheral surface of the filter 410 and the outer peripheral surface of the filter 410. The filter 410 comprises one of a tubular shape and a cylindrical shape. The filter 400 also comprises an air inlet 450. The air inlet 450 can be referred to as an inlet port. The air inlet 450 is coupled to the first portion 420 in a fluid communication with the open space 402. There is also an air outlet 460. The air outlet 460 can be referred to as an outlet port. The air outlet 460 is coupled to the second portion 430 in the fluid communication with the hollow interior. An inner peripheral surface of the filter 410 defines an air passageway 414 from the air inlet 450 to the air outlet 460. A fluid inlet 458 is configured to connect to compressed fluid source. A nozzle 130 is coupled to the second air inlet 458 in a fluid communication therewith, the nozzle 130 disposed within the air passage 414. There is an opening 480 through a wall thickness in the second portion 430. A cover 490 is mounted to the second portion 430 to selectively open and close the opening 480. In an example, the cover 490 can be attached to the exterior surface of the second portion 430 with fastener(s). In an example, the cover 490 can be mounted, at one end thereof, to the exterior surface of the second portion 430 for a pivotal movement to reduce time necessary to open and close the opening 480. In an example, the cover 490, can be configured to engage the opening 480 in a snap-fit arrangement. The cover 490 can be adapted with a flange (not shown) so that the cover 490 can be grasped easier during manual operation. During operation, the nozzle 130 is operable to expel the compressed air through the filtering medium 412 and purge contaminants in the filtering medium 412 into the open space 402 and toward the opening 480. In a further reference to FIG. 9, the nozzle 130 is mounted for each of a rotation within the air passage 414 and a linear movement between the inner surface of the first portion 420 and the inner surface of the second portion 430. However, when the nozzle 130 is provided in an arrangement of FIG. 5B or 5C, the nozzle 130 can be mounted only for a rotation within the air passage 414. Or, the nozzle 130 of FIG. 5C can be positioned stationary. Thus, in an example, the nozzle 130 can comprise a plurality of nozzles 130, the plurality of nozzles 130 being spaced apart equally with each other in a plane being normal to a distance between the inner end surface of the first portion 420 and the inner end surface of the second portion 430. In an example, the nozzle 130 can comprise a plurality of nozzles 130, the plurality of nozzles 130 being spaced apart with each other along a distance between the inner surface of the first portion 420 and the inner surface of the second portion 430, the plurality of nozzles 130 being mounted for a rotation within the air passageway 414. In an example, the nozzle 130 comprises a plurality of nozzles 130, the plurality of nozzles 130 being spaced apart with each other along a distance between the inner surface of the first portion 420 and the inner surface of the second portion 430, the plurality of nozzles 130 configured to expel the compressed air in different directions from each other. In an example, the nozzle 130 comprises a plurality of nozzles 130, the plurality of nozzles 130 being mounted for at least one of a rotation and a linear movement. The air filter 400 can comprise a valve 470 on the air inlet 450. The valve 470 can be of an elastic type.

Figure 11:
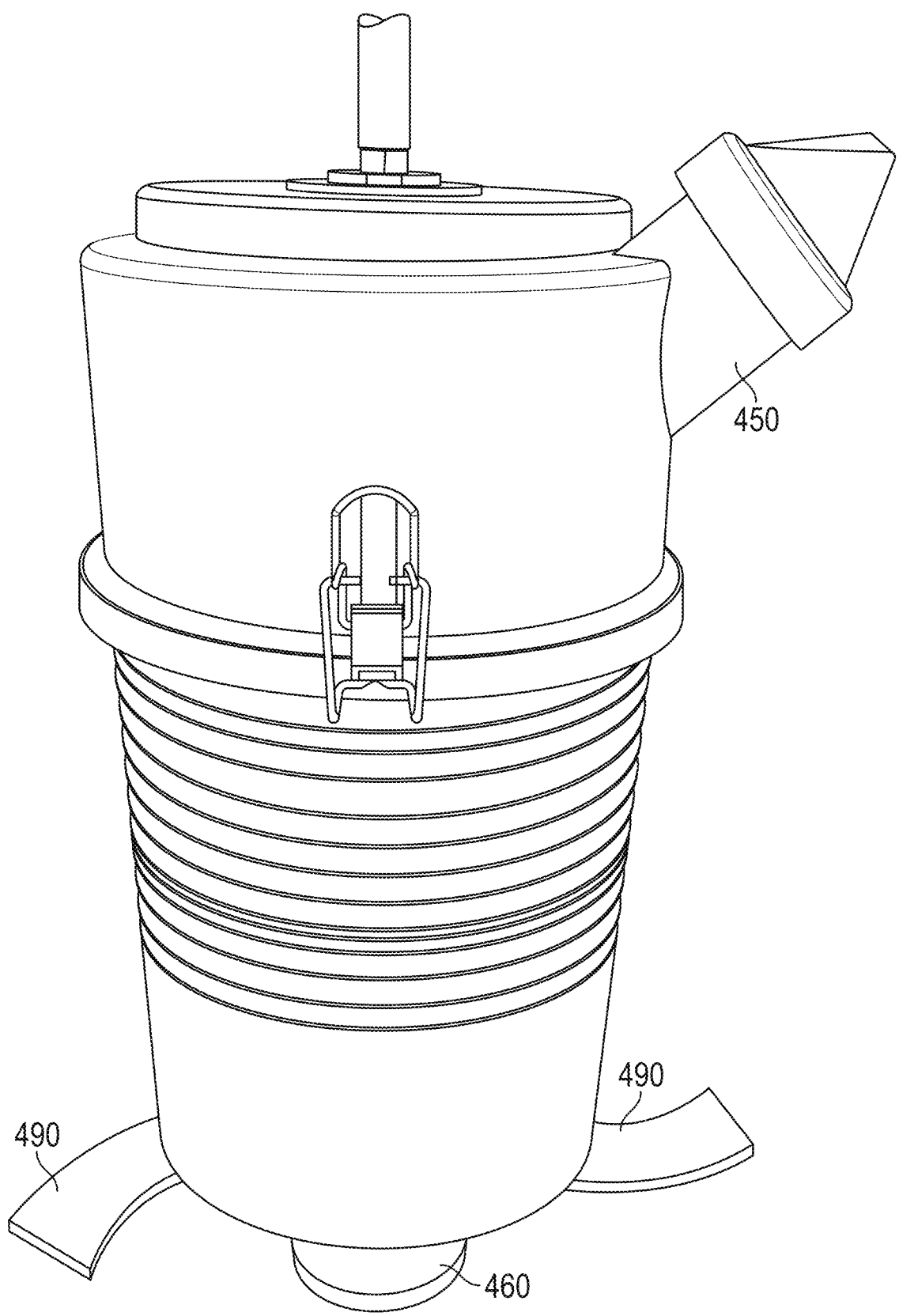
FIG. 11 illustrates a perspective view of the filtering medium cleaning apparatus of FIG. 8.
Figure 12:
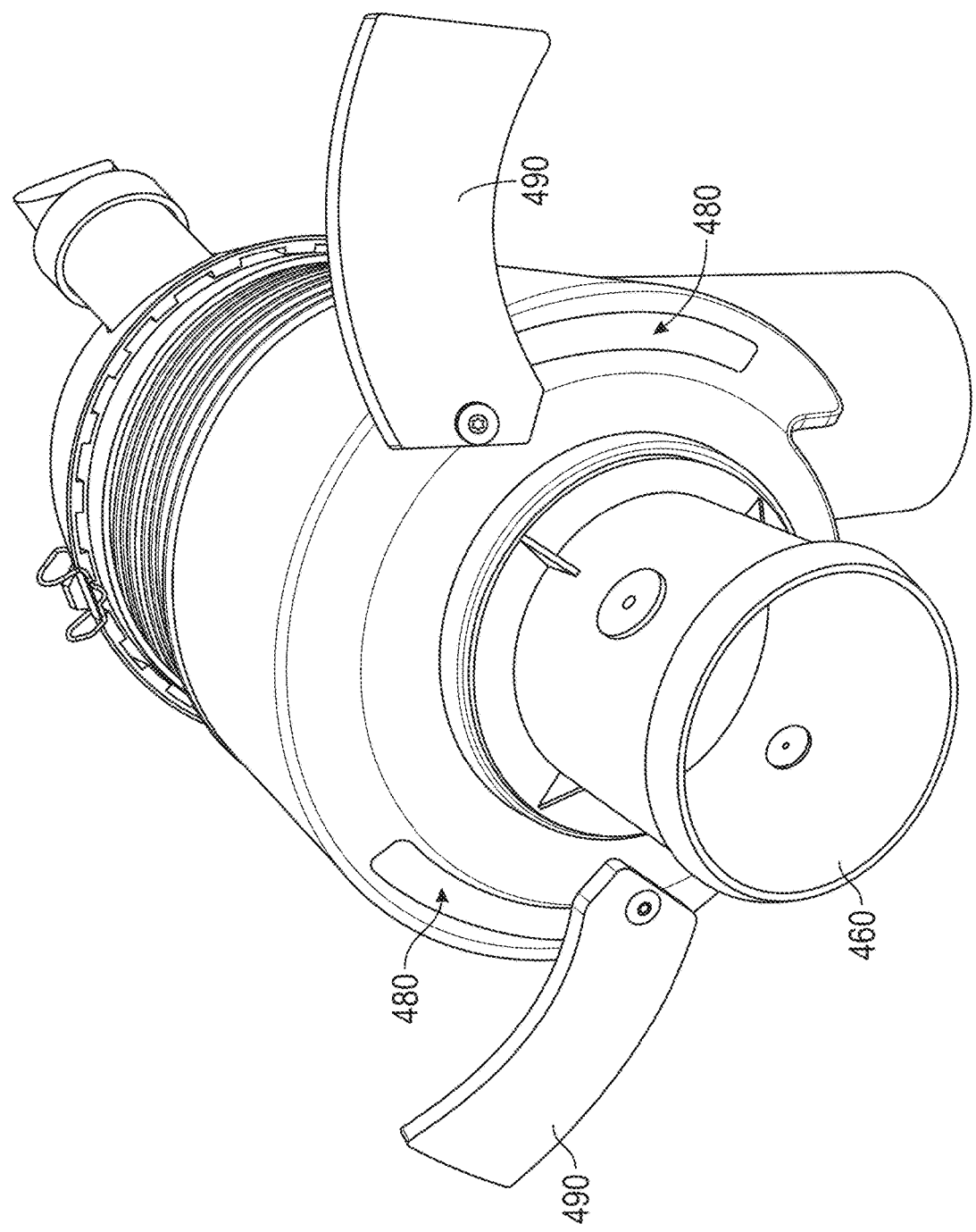
FIG. 12 illustrates a perspective view of the filtering medium cleaning apparatus.
Figure 13:
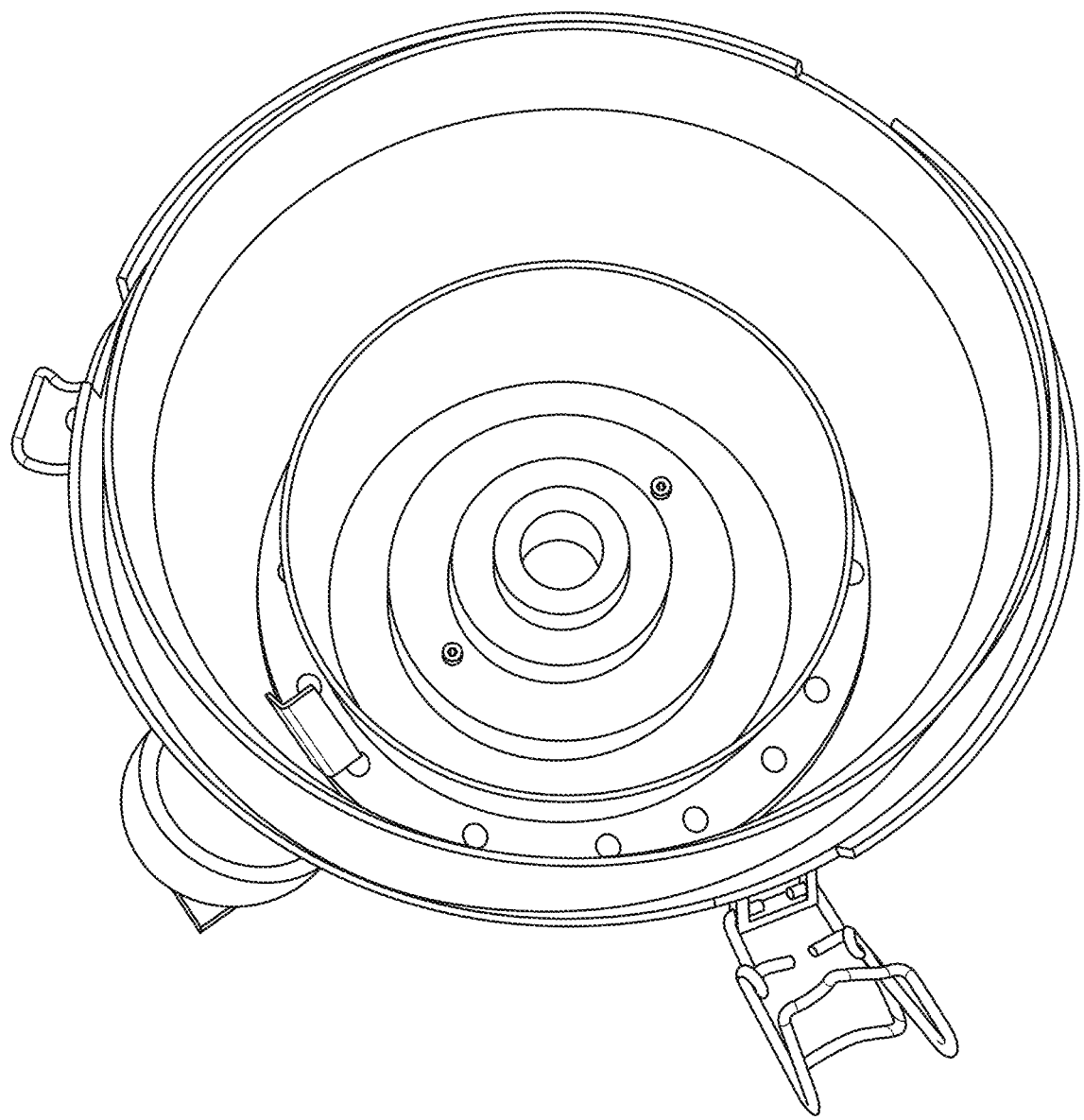
FIG. 13 illustrates a partial perspective view of an interior of the filtering medium cleaning apparatus.
Figure 14:
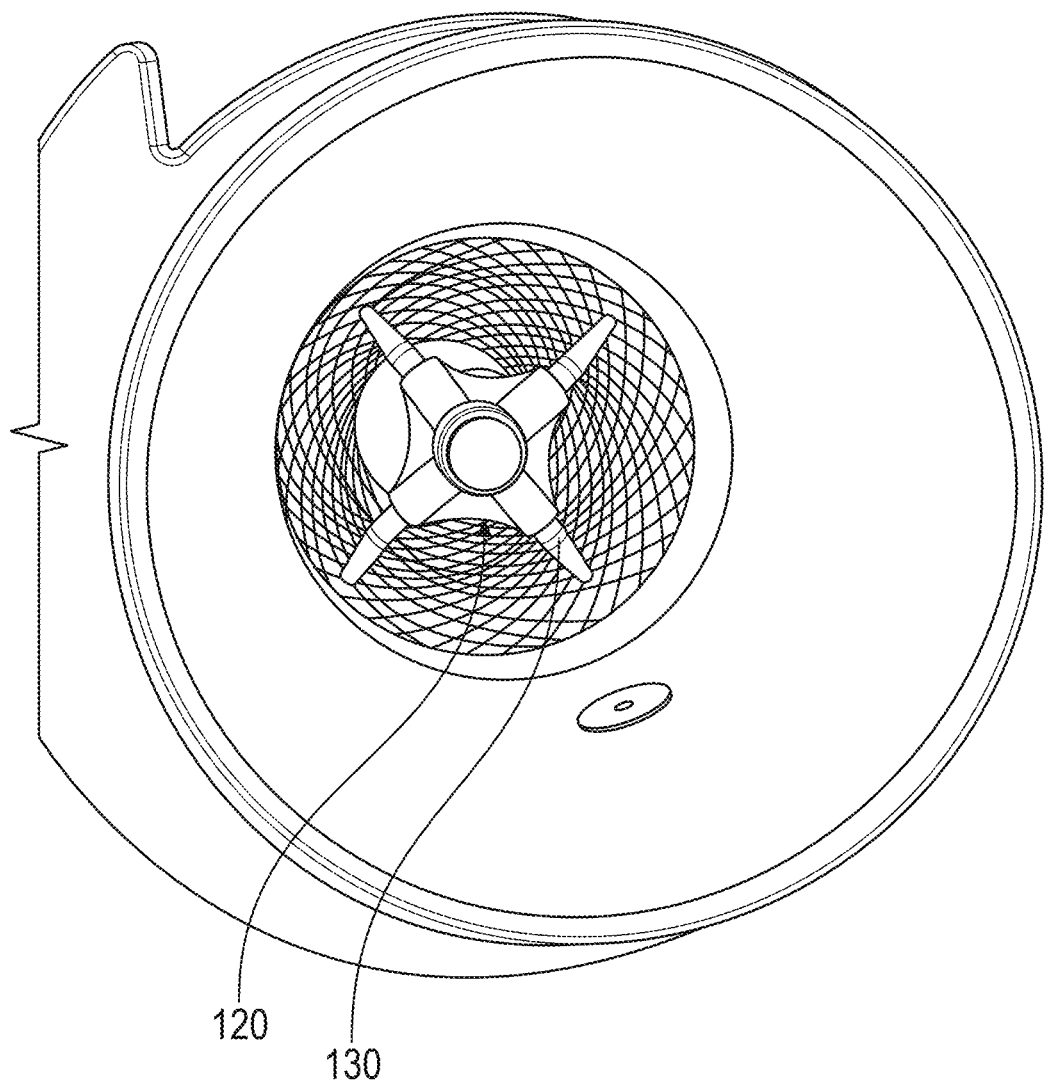
FIG. 14 illustrates a partial perspective view of the interior of the filtering medium cleaning apparatus, particularly showing a fluid nozzle.

In operation, as the air flows from the air inlet 450 through the filtering medium 412 into the air outlet 460, any contaminants will be lodged within the filtering medium 412. Compressed fluid supplied through the fluid inlet 456 will rotate the nozzle(s) 130 through the rotor 120 and will expel compressed air toward to the interior surface of the filter 410 and through a thickness of the filtering medium 412. This action will expel contaminants from the filter 410 into the open space 402. When the air filter 400 is installed generally vertically, the contaminants will fall on the inner surface of the second portion 420. The opening 480, when opened by the cover 490, discharges the contaminants external to the housing 418. FIG. 11 shows two covers 490, correlating to two openings 480. The second cover 490 can be used to decrease the time necessary to purge contaminants. Furthermore, the cover 490 can be referred to as a flap or as a trap door.

In an example, the above described air filter 400 does not have to be provided with the fastener 440, the first portion 420 and the second portion 430 are permanently joined to each other. This self-cleaning air filter 400 can be made disposable when the filter 410 is no longer capable, after a period of time, of properly filtering air due to contaminants damaging the filtering medium 412.

Or, in an example, the fastener 440 can be replaced by a friction or a snap fit between the free edges of the first portion 420 and the second portion 430.

The housing 418 may be adapted with the above described receptacle 200.

The air filter 400 may be adapted with a powered actuator device 340, as described above.

The air filter 400 may be provided without opening(s) 480 and cover(s) 490. The expelled contaminants in such air filter 400 will be purged by detaching the second portion 430 from the first portion 420 at the clasp(s) 440. When the second portion 430 is empty from contaminants, such empty second portion 430 is re-attached to the first portion 420. In this arrangement, the air outlet 660 may be also detached from and re-attached at a connection with the air intake apparatus (system).

It will be understood that the air filter 400 provides a self-cleaning air filter 400. Thus, a self-cleaning air filter 400 comprises a housing 418 with a first portion 420 and a second portion 430, the first portion 420 and the second portion 430 defining each of a hollow interior and a peripheral inner surface of the housing 418. A detachably attaches the second portion 430 to the first portion 420. A filter 410 is disposed within the hollow interior between an inner surface of the first portion 420 and an inner surface of the second portion 430, an inner peripheral surface of the filter 410 defining an air passage 414 from the air inlet 450 to the air outlet 460, an outer peripheral surface of the filter 410 is inset from the peripheral inner surface of the housing 418 and defines an open space 402, the filter 410 comprises a filtering medium 412, the filtering medium 412 disposed between the inner peripheral surface of the filter and the outer peripheral surface of the filter. An air inlet 450 is coupled to the first portion 420 in a fluid communication with the open space 402. An air outlet 460 is coupled to the second portion 430 in the fluid communication with the hollow interior. A second air inlet 456 is configured to connect to compressed air source. A nozzle 130 is coupled to the second air inlet 456 in a fluid communication therewith, the nozzle 130 disposed within the air passage 414. The nozzle 130 is operable to expel the compressed air through the filtering medium 412 and purge contaminants in the filtering medium 412 into the open space 402 and toward the second portion 430, where the second portion 430, when detached from the first portion 420, for example at the fastener 440, discharges the contaminants external to the housing 418.

Figure 15:
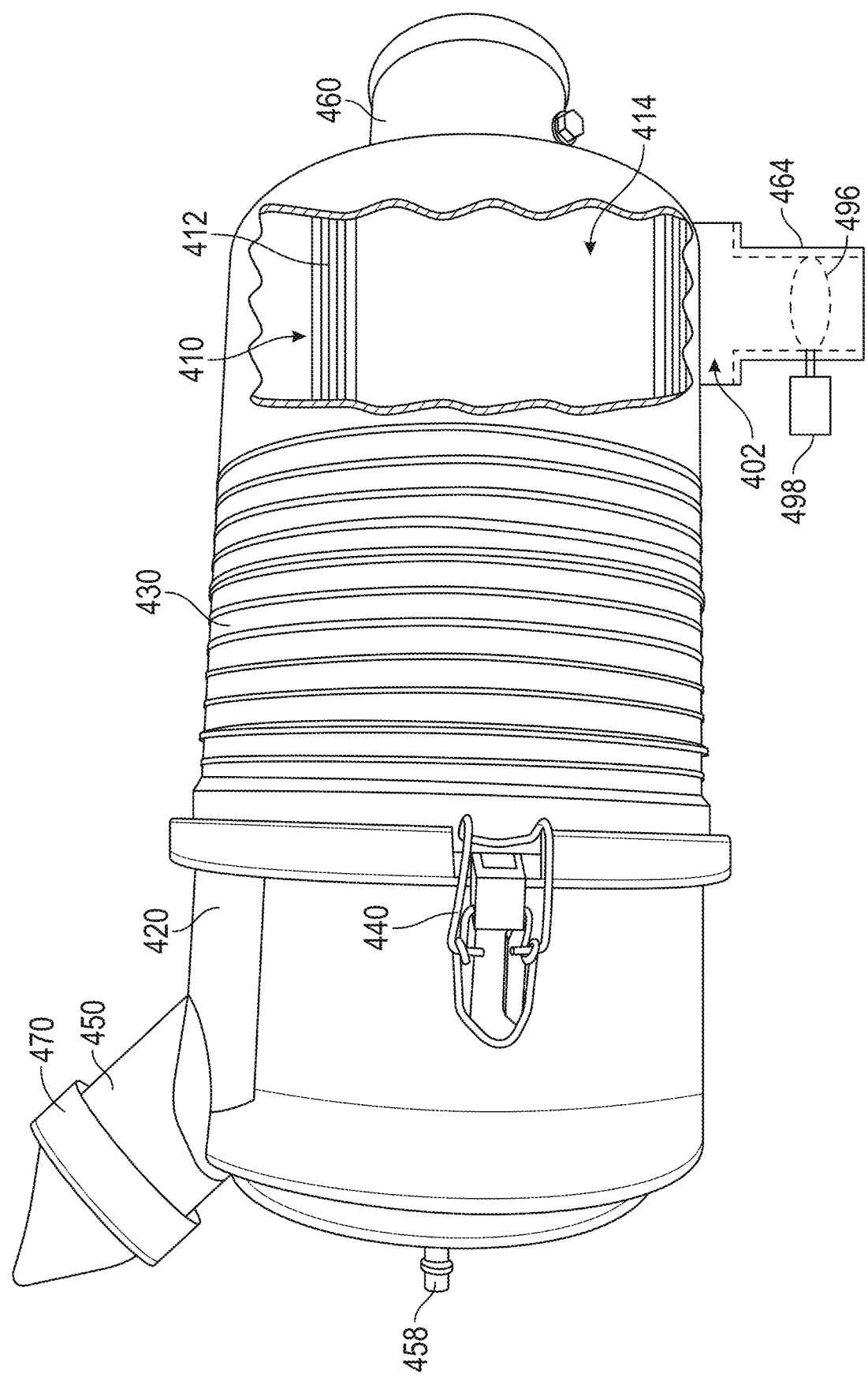
FIG. 15 illustrates an elevation view of the filtering medium cleaning apparatus.

FIG. 15 illustrates the self-cleaning air filter 400 as being used in a generally horizontal direction. The nozzles 130 are not illustrated in FIG. 15.

Thus, a self-cleaning air filter 400 comprises a housing 418 with a first portion 420 and a second portion 430, the first portion 420 and the second portion 430 defining each of a hollow interior and a peripheral inner surface of the housing 418. A detachably attaches the second portion 430 to the first portion 420. A filter 410 is disposed within the hollow interior between an inner surface of the first portion 420 and an inner surface of the second portion 430, an inner peripheral surface of the filter 410 defining an air passage 414 from the air inlet 450 to the air outlet 460, an outer peripheral surface of the filter 410 is inset from the peripheral inner surface of the housing 418 and defines an open space 402, the filter 410 comprises a filtering medium 412, the filtering medium 412 disposed between the inner peripheral surface of the filter and the outer peripheral surface of the filter. An air inlet 450 is coupled to the first portion 420 in a fluid communication with the open space 402. An air outlet 460 is coupled to the second portion 430 in the fluid communication with the hollow interior. A second air inlet 456 is configured to connect to compressed air source. A nozzle 130 is coupled to the second air inlet 456 in a fluid communication therewith, the nozzle 130 disposed within the air passage 414. The self-cleaning air filter 400 of FIG. 15 is being further illustrated as comprising a contaminant outlet 464 which is in an open communication with the open space 402. A damper 496 is mounted within the contaminant outlet 464 for a movement between a first position where the damper 496 closes the contaminant outlet 464 and a second position where the damper 496 opens the contaminant outlet 464. The nozzle 130 is operable to expel the compressed air through the filtering medium 412 and purge contaminants in the filtering medium 412 into the open space 402 and toward the second portion 430. The contaminant outlet 464, when open through the damper 496, discharges the contaminants external to the housing 418. At least a portion of the peripheral wall of the housing 418 can be tapered to assure that contaminants will be discharged through the contaminant outlet 464. In an example, the self-cleaning air filter can comprise a lever (not shown) disposed external to the contaminant outlet 464, the lever connected to the damper 496, the lever being manually operable to move the damper between the first and second positions. In an example, the self-cleaning air filter 400 can be adapted with an actuator 498, the actuator 498 coupled to the damper 496, the actuator 498 operable to move the damper 496 between the first and second positions. In an example, the actuator 498 can comprise a rotary solenoid valve. In an example, the actuator 498 can comprise a rotary pneumatic actuator.

The damper 496 may be replaced with the cover(s) 490 of FIG. 11 where the cover(s) 490 will be modified to fit the contour of the peripheral wall of the second portion 430.

In the above described self-cleaning air filter 400, the filter 410 can be easily replaced when the filter 410 is no longer capable, after a period of time, of properly filtering air due to contaminants damaging the filtering medium 412. Furthermore, the above described self-cleaning air filter 400 can be provided without the filter 410 where the housing 418 has been damaged during use either due to improper handling or due to operation involving flying rocks or other debris. The first portion 420 or the second portion 430 can be also provided independently from each other.

It is also to be noted that the air inlet 450 and the air outlet 660 can be reversed. In other words, the air can enter through the air outlet 660 that will become an air inlet and exit through the air inlet 550 that will become an air outlet.

Furthermore, the nozzle 130 may be adapted for automatic movement in a linear direction. In an example, the self-cleaning air filter 400 can be configured with an electric motor and rollers of FIGS. 6-7. In application when the self-cleaning air filter 400 is installed on off-road vehicles (not shown), the electric motor can be connected to a battery of such off-road vehicles. The electric motor can be also replaced with a rotary air actuator in applications where electric energy may not be readily available.

Figure 16:
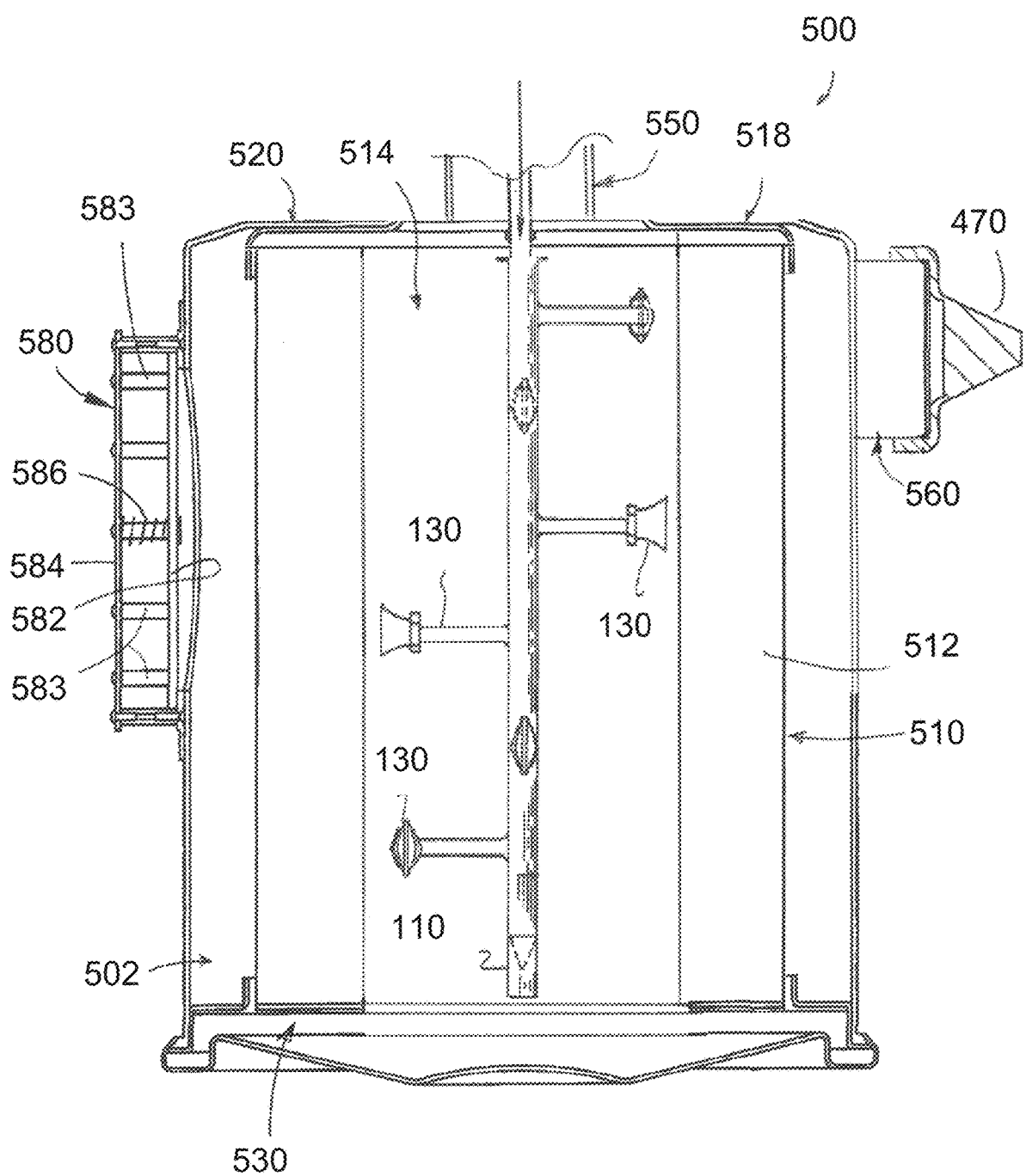
FIG. 16 illustrates an elevation view of the filtering medium cleaning apparatus, particularly showing an air expelling device of FIG. 5B and a contaminant evacuation valve.
Figure 17:
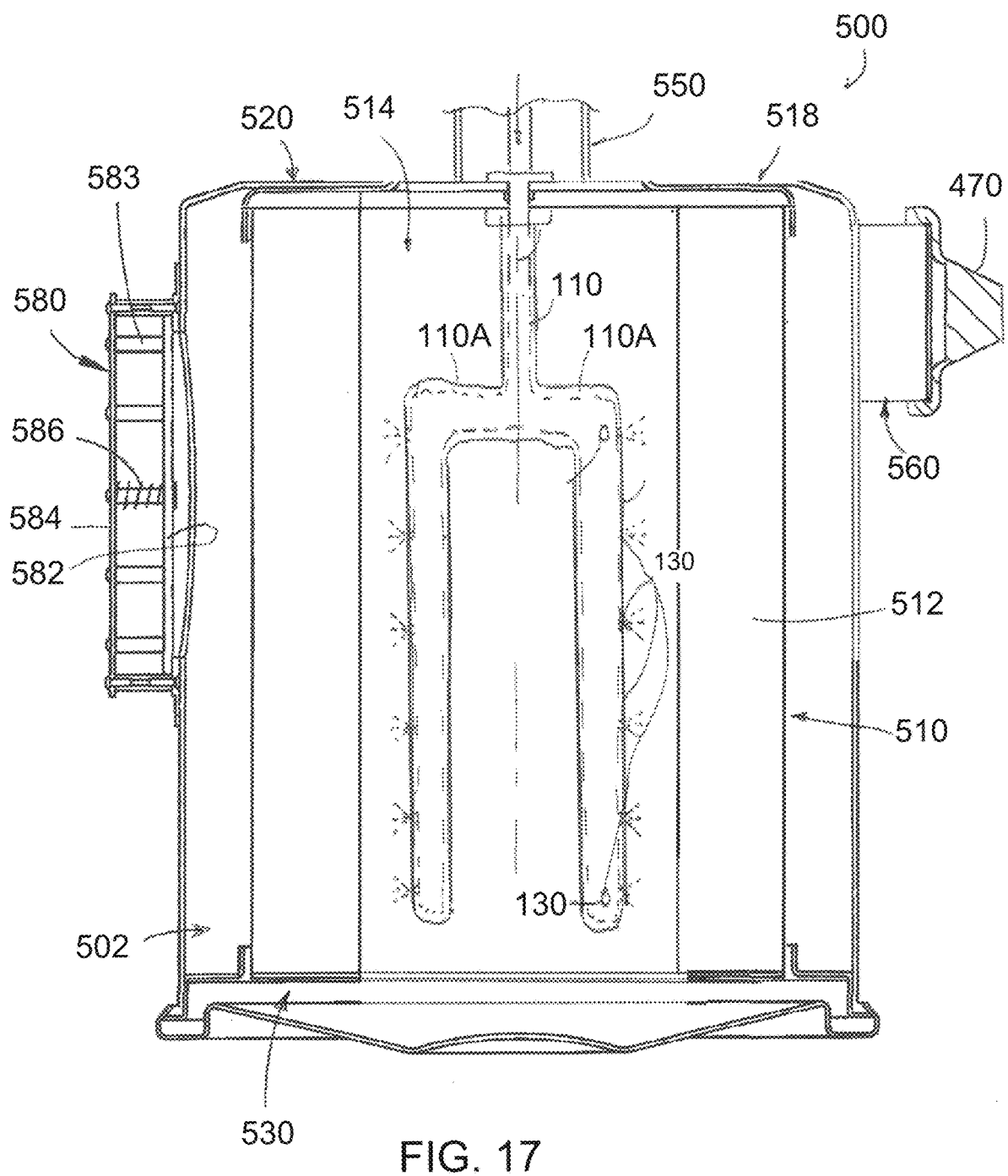
FIG. 17 illustrates an elevation view the filtering medium cleaning apparatus, particularly showing an air expelling device of FIG. 5C and a contaminant evacuation valve.
Figure 18:
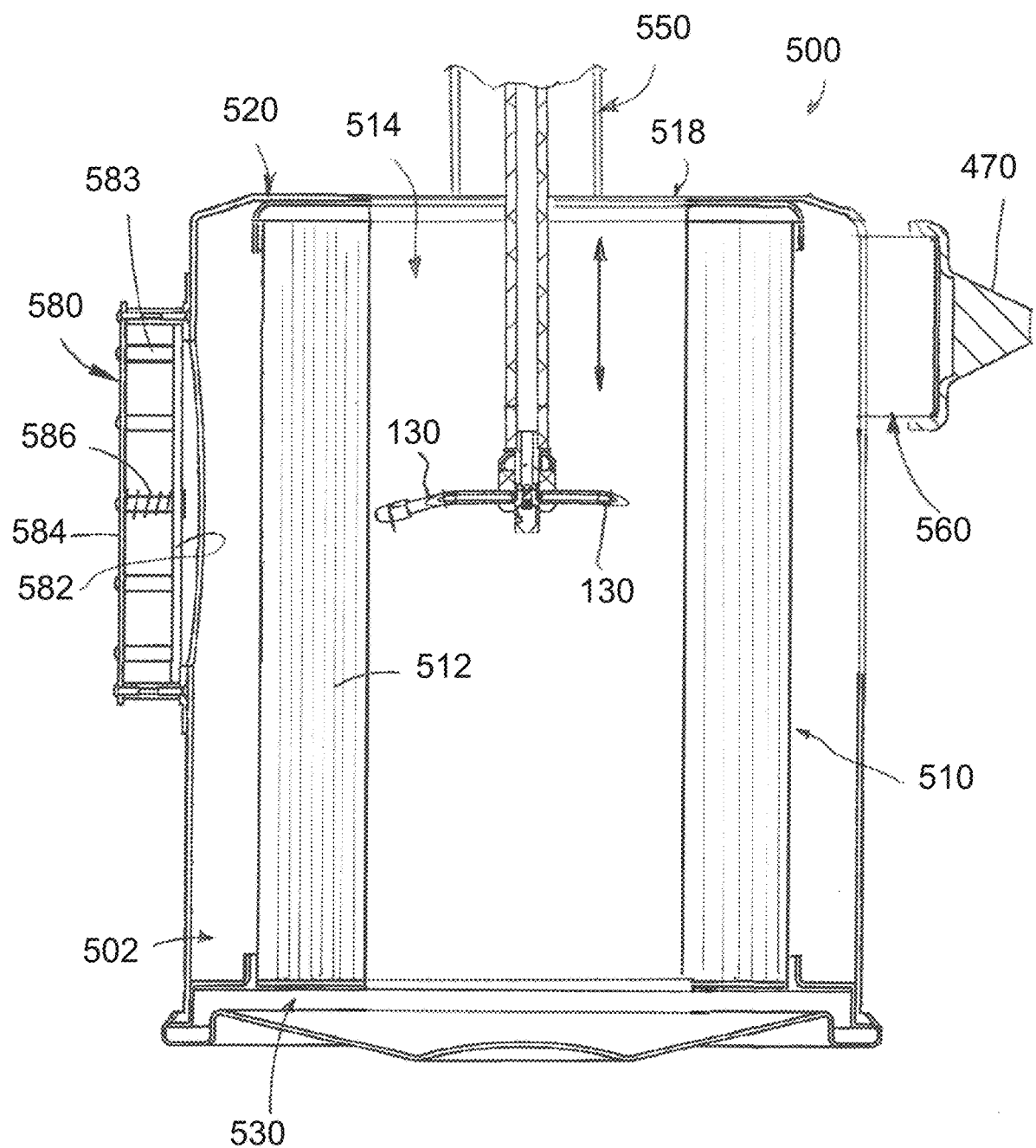
FIG. 18 illustrates an elevation view the filtering medium cleaning apparatus, particularly showing an air expelling device of FIG. 1 and particularly showing a contaminant evacuation valve.

FIGS. 16-18 illustrate an air cleaner assembly 500. In air cleaner assembly 500 comprises a housing 518 having an outer wall defining an air flow inlet, an air flow outlet and a hollow interior section 502. The housing can comprise a first portion 520 and a second portion 530. Inlet 550 and outlet 560 are provided. The housing 518 is openable for service access to the interior section. A serviceable and selectively removable filter cartridge 510 is positioned in the housing. The filter cartridge 510 includes a filter media 512 surrounding an open central interior 514. The filter cartridge 510 can be referred to as a filter. The filter media 512 can be also referred to as a filtering medium. An evacuation valve arrangement 580 is mounted on the housing 518 to receive ejected contaminants from the filter cartridge 510 and direct the received ejected contaminants out of the housing 518. The evacuation valve arrangement 580 comprises a spring-loaded pulse pressure vent (PPV) 580, which vents the compressed air pulse from the housing 518 during the self-cleaning cycle of filter cartridge 510. PPV 580 also acts as a vent for the dust removed during cleaning to be blown out of the housing. PPV 580 vents the over-pressure on the outside of filter cartridge 510 from the compressed air supply so that a pressure differential is maintained between the inside and outside of the filter so that the cleaning action is maintained through the cleaning cycle. PPV 580 also acts as a vent for the contaminants removed during cleaning to be manually blown out of housing 518. PPV 580 is mounted between the inlet and outlet ends of housing 518 within an opening 522 in the housing sidewall. PPV 580 includes an annular mounting pad 582, which is securely seated within opening 522 of the housing 518. A plurality of spacers or posts 583 extending from mounting pad 582 suspend a cover plate 584 over opening 522. A helical spring 586 biases a rigid diaphragm with a pliable seal against mounting pad 582 to hold PPV 580 closed sealing the housing 518. Spring 586 is selected so that PPV 580 opens at a predetermined positive pressure within the housing 518. More than one PPV 580 can be provided on the housing 518.

FIG. 16 illustrates a nozzle arrangement of FIG. 5B.

FIG. 17 illustrates a nozzle arrangement of FIG. 5C.

FIG. 18 illustrates a nozzle 130 of FIG. 1 that is mounted for each of a linear movement and a rotation, by way of the rotor 120 within the open central interior 514.

It is to be understood that the PPV 580 can be provided with the self-cleaning air filter 100 of FIG. 1 and FIGS. 8-15.

Furthermore, a dump reservoir (not shown) can be provided in an operative communication with the contaminant outlet 464 to accumulate the purged contaminants for controlled contaminant disposal, without releasing the contaminants back into atmosphere.

Figure 19:
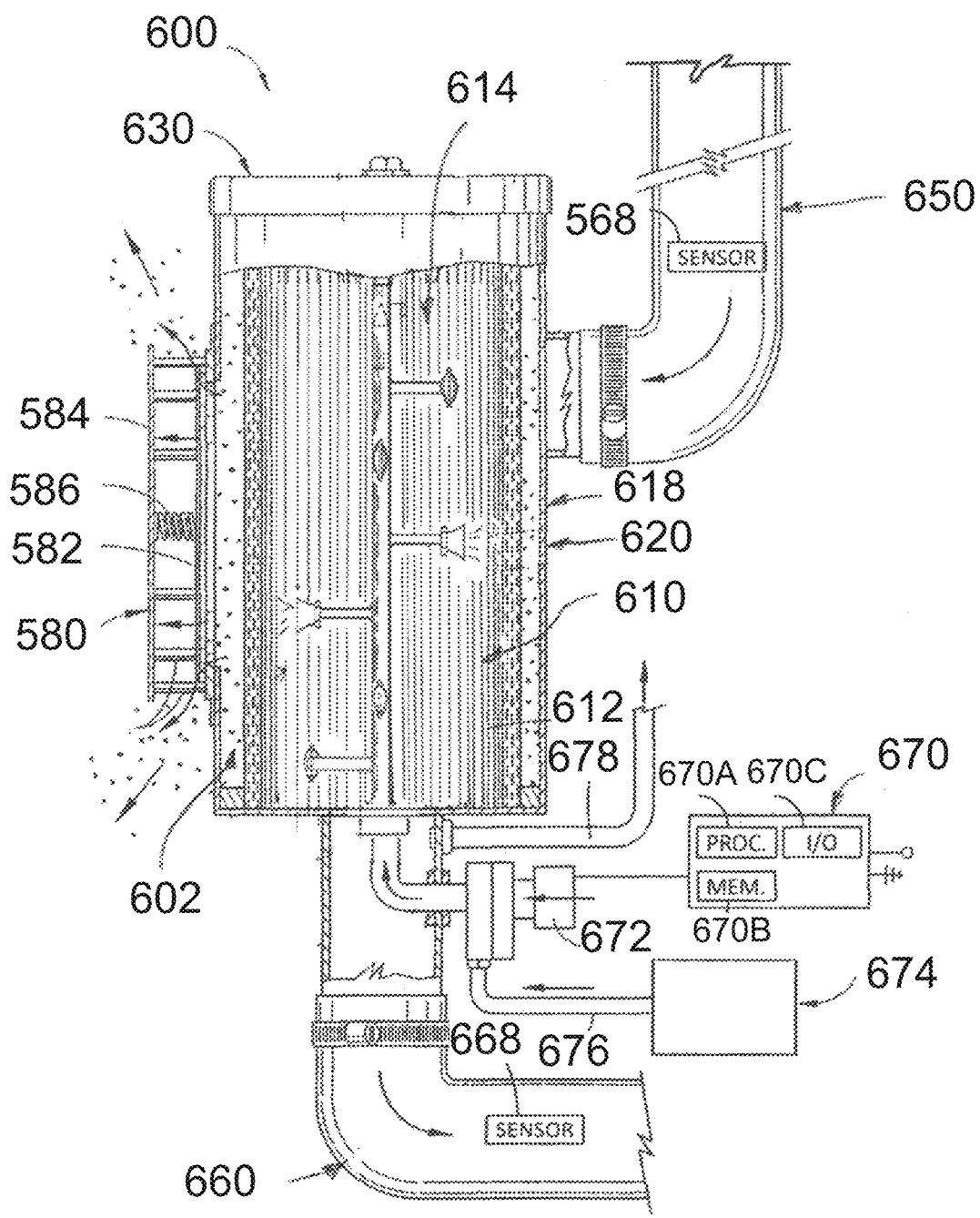
FIG. 19 illustrates an elevation view of a filtering medium cleaning assembly.
Figure 20:
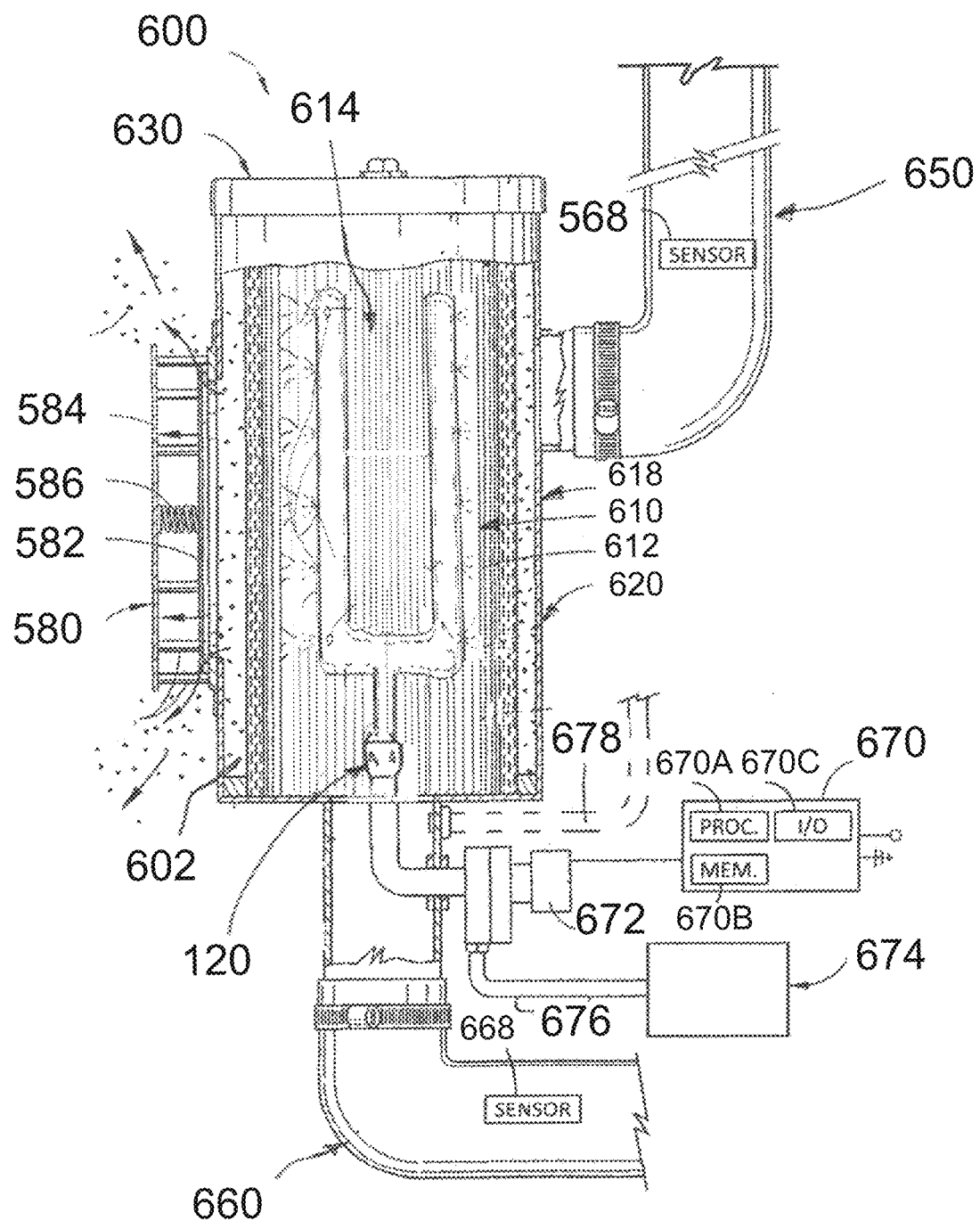
FIG. 20 illustrates an elevation view of a filtering medium cleaning assembly.

FIGS. 18-20 illustrate an air cleaner assembly 600. The air cleaner assembly includes a housing 618 having an outer wall defining an air flow inlet, an air flow outlet and a hollow interior section 602. The housing can comprise a first portion 620 and a second portion 630. Inlet 650 and outlet 660 are provided. The outlet can have a valve 470 thereon. The housing 618 is openable for service access to the interior section. A serviceable and selectively removable filter cartridge 610 is positioned in the housing. The filter cartridge 610 includes a filtering medium 612 surrounding an open central interior 614. An evacuation valve arrangement 580 is mounted to the housing 518 to receive ejected contaminants from the filter cartridge 610 and direct the received ejected contaminants out of the housing 518. The evacuation valve arrangement 580 comprises a spring-loaded pulse pressure vent (PPV) 580, which vents the compressed air pulse from filter housing 618 during the self-cleaning cycle of air cleaner assembly 600. PPV 580 also acts as a vent for the contaminants removed during cleaning to be blown out of the housing. PPV 580 vents the over-pressure on the outside of filter cartridge 610 from the compressed air supply so that a pressure differential is maintained between the inside and outside of the filter so that the cleaning action is maintained through the cleaning cycle. PPV 580 also acts as a vent for the contaminants removed during cleaning to be manually blown out of filter housing 618. PPV 580 is mounted between the inlet and outlet ends of filter housing 618 within an opening 522 in the housing sidewall. PPV 580 includes an annular mounting pad 582, which is securely seated within opening 622 of filter housing 618. A plurality of spacers or posts 583 extending from mounting pad 582 suspend a cover plate 584 over opening 622. A helical spring 586 biases a rigid diaphragm with a pliable seal against mounting pad 582 to hold PPV 580 closed sealing filter housing 618. Spring 586 is selected so that PPV 580 opens at a predetermined positive pressure within filter housing 618. More than one PPV 580 can be provided on the housing 618.

A pulse valve 672 is being mounted to the side of outlet port 660 and operably connected to a compressed air source 674 by way of an airline 676. Pulse valve 672 releases short blasts or pulses of compressed air from the compressed air source within filter cartridge 610, which facilitates the self-cleaning action of the filter cartridge 610. The pulse valve 672 may be a conventional solenoid type control valve where a solenoid (not shown) actuates a diaphragm (not shown) to open and close the valve. Pulse valve 672 is mounted to the side of outlet port 660. The outlet port 660 connects to the engine's air intake system. An elbow connects the output of pulse valve 672 to nozzle(s) 130, which is centered along the longitudinal axis of filter casing 618. Pulse valve 672 is under the control of an electronic control module 670, which actuates the solenoid to open and close the valve at predetermined intervals. Control module 670 is electrically powered by any available internal or external power source, but is generally powered using the electrical power source found in the equipment or vehicle. Control module 670 may include processing circuitry 670A, memory 670B and an I/O interface 670C for connection to other control system sensors and devices. The processing circuitry generally includes a suitable general purpose computer processing circuit, such as a microprocessor and its associated circuitry. The processing circuit is operable to carry out the operations attributed to it herein. Within the memory are various program instructions. The program instructions are executable by the processing circuit and/or any other components of the control module 670 as appropriate. If desired, one or more of the components of the control module 670 may be provided as a separate device, which may be remotely located from the other components of the control module. Thus, a pulse jet distribution arrangement communicates with the interior of the housing and includes a device configured to direct a pulse of compressed gas into the interior of the filter cartridge through nozzle(s) 130.

FIG. 19 illustrates a nozzle arrangement of FIG. 5B.

FIG. 20 illustrates a nozzle arrangement of FIG. 5C.

Figure 21:
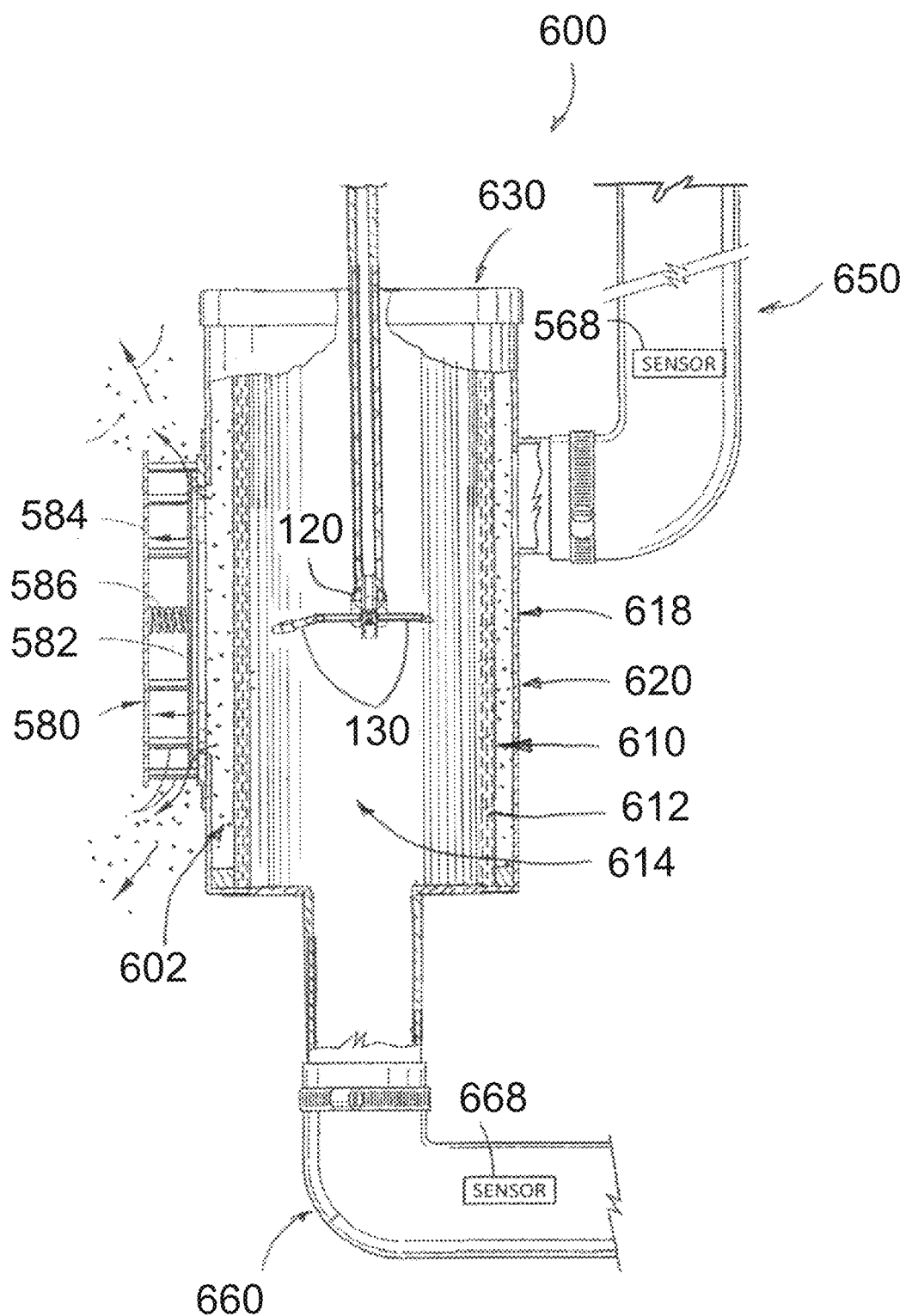
FIG. 21 illustrates an elevation view of a filtering medium cleaning assembly.

FIG. 21 illustrates a nozzle 130 of FIG. 1 that is mounted for each of a linear movement and a rotation, by way of the rotor 120 within the open central interior 614.

Compressed air source 674 supplies the volume of clean dry compressed air to filter cartridge 610 from which the compressed air pulse is released within filter cartridge 610 to facilitate the self-cleaning action. The necessary volume and pressure of the compressed air supplied from the compressed air source is determined by several factors, including, but not limited to the volume and configuration of filter cartridge 610, the type of filter cartridge 610, the volume and properties of dust within the inlet airflow, and the frequency of the air filter's cleaning cycle. The filter cartridge 610 can be connected to any suitable and available compressed air source, whether specifically dedicated to supplying the air filter or one presently existing in the equipment or vehicle application that is available to supply the air filter. Compressed air source 674 can include at least one of a compressor unit, a storage tank, a compressed air dryer and moisture drain switch. Compressed air source 674 may also include other ancillary components (not shown), such as, but not limited to, compressed air filters, water purge valves, pressure gages and switches, hoses, lines, clamps and fittings. Generally, the components which make up the compressed air source 674 are of conventional design well known in the art. Compressor unit, storage tank and other components of compressed air source 674 are selected so that the compressed air source supplies filter cartridge 610 with the volume of clean, dry compressed air necessary for generating the required compressed air pulse within the air filter.

Figure 22:
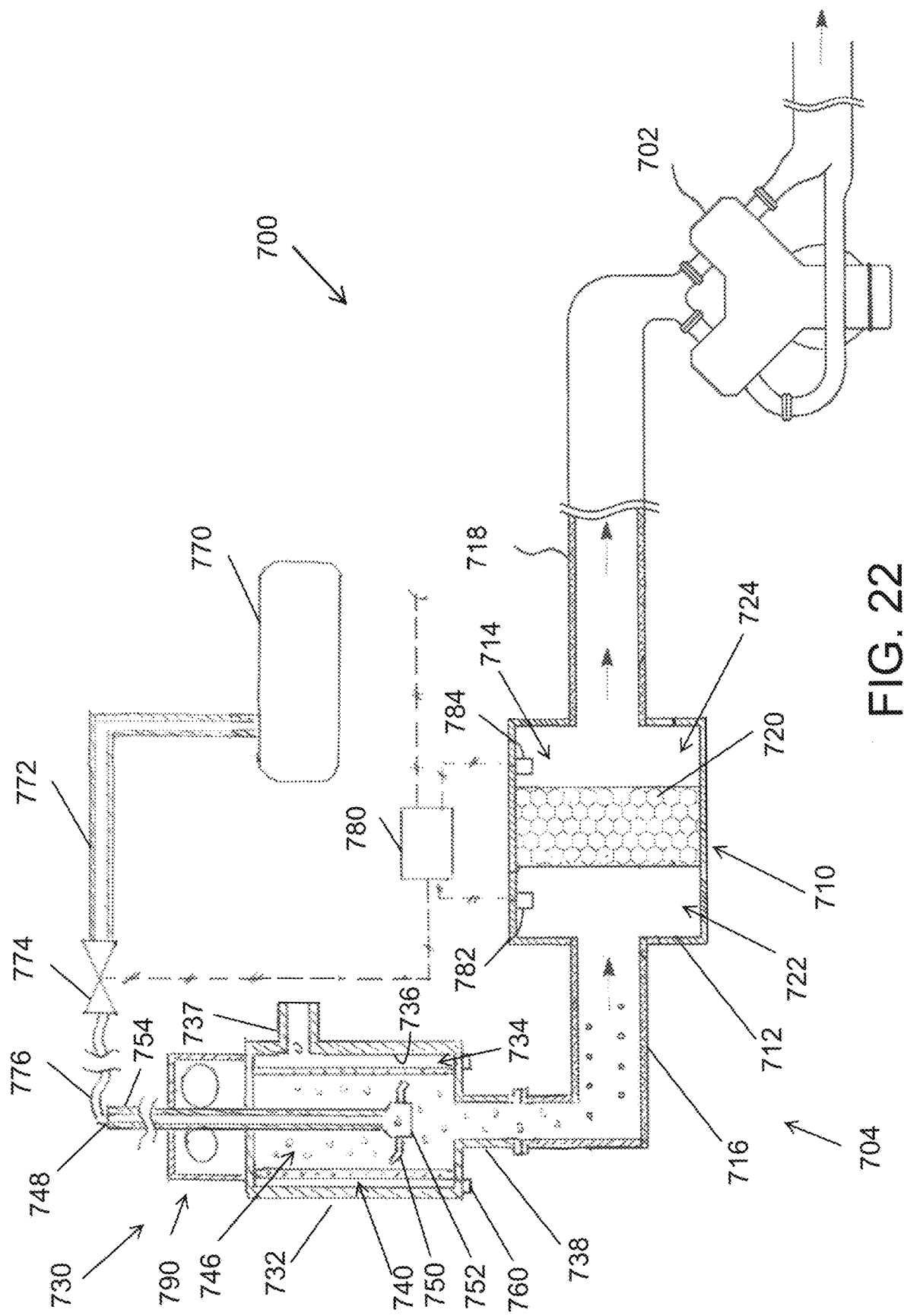
FIG. 22 illustrates an elevation view of a filtering medium cleaning apparatus designed for use with internal combustion engines.

Now in reference to FIG. 22, therein is illustrated an air intake system 704 for an engine 702, the air intake system 704 comprises a filter assembly 710 configured to provide filtered air to the engine 702 for combustion. The filter assembly 710 comprises a housing 712 that defines a hollow interior 714. An inlet port 716 and an outlet port 718 are coupled to the housing 712 in a fluid communication with the hollow interior 714. A filter 720 is disposed within the hollow interior 714 of the housing 712. The filter 720 comprises filtering medium that is configured to filter contaminants from an air supply through the inlet port 716 so that these contaminants do not clog the engine 702 through the outlet port 718. In an example, the filter 720 may be sized to fill the hollow interior 714. In an example, the filter 720 can be sized and position within the hollow interior 714 to define an inlet chamber 722 in a fluid communication with the inlet port 716 and an outlet chamber 724 in a fluid communication with the outlet port 718. Because the contaminants clog the filtering medium during operation of the engine 702, the air intake system 704 comprises a filter assembly 730. The filter assembly 730 comprises a housing 732. The housing 732 defines each of a hollow interior 734 and a peripheral inner surface 736 of the housing 732. The housing 732 comprises an inlet port 737 and an outlet port 738 in a fluid communication with the inlet port 716. A filter or a filter cartridge 740 is disposed within the hollow interior 734 between ends of the housing 732. An outer peripheral surface of the filter or filter cartridge 740 is inset from the peripheral inner surface 736 of the housing 732 and defines an open space. The filter 740 comprises a filtering medium, the filtering medium is disposed between the inner peripheral surface of the filter 740 and the outer peripheral surface of the filter 740. The filter 740 comprises one of a tubular shape and a cylindrical shape. An inner peripheral surface of the filter 740 defines an air passageway 746 from the first air inlet 716 to the air outlet 738. A fluid inlet 748 is configured to connect to compressed fluid source. The compressed fluid may be a compressed air. The compressed fluid may be a compressed gas. The compressed fluid may be a liquid under pressure. A nozzle 750 is coupled to the fluid inlet 748 in a fluid communication therewith through the rotor 752 and a conduit 754. The nozzle 750 is disposed within the air passage 746. The nozzle 750 may be provided as an aperture or vent in through the wall thickness of the conduit 754. There is an opening (not shown) through a wall thickness in the housing 732. The opening may be the opening 480, as described above. A flap or cover 760 is mounted to the housing 732 to selectively open and close the opening. During operation, the nozzle 750 is operable to expel the compressed air through the filtering medium and purge contaminants in the filtering medium into the open space 734 and toward the opening. In a further reference to FIG. 22, the nozzle 750 is mounted for each of a rotation within the air passage 746 and a linear movement along a length of the filter 740. The linear movement can be achieved with the device 790 that may be identical to the device of FIGS. 6-7. An air reservoir 770 is provided to store air at a pressure and is configured to provide air to the air filter for a purging operation to purge contaminants from the pre-cleaner filter assembly 730, and more particularly, to the fluid inlet 748. A control valve 744 is mounted in the compressed air supply provided by connection 772, 776 and is configured to control flow of air from the air reservoir 770 to the pre-cleaner filter assembly 730. The connection 776 is flexible, by way of a hose. The connection 772 can be either flexible or rigid. A controller 780 is configured to activate the pre-cleaner filter assembly 730 to expel air under pressure from the nozzle(s) 750 and purge contaminants from the filter 740 during the purging operation to purge contaminants from the pre-cleaner filter assembly 730, and deactivate the device upon determination of a completion of the purging operation to purge contaminants from the pre-cleaner filter assembly 730, wherein the controller 780 is configured to determine a clogging of the pre-cleaner filter assembly 730, wherein the pre-cleaner filter assembly 730 is activated when the clogging of the filter 740 is above a clogging threshold value. The controller 780 is configured to determine an initiation of the purging operation to purge contaminants from the filter 740, wherein the controller 780 activates the device when the initiation of the purging operation to purge contaminants from the filter 740 is determined. The controller 780 can be configured to determine initiation of the purging operation to purge contaminants from the filter 740 by detecting a voltage signal receivable by the control valve 774, and determining the initiation of the purging operation to purge contaminants from the filter 740 when the voltage signal is detected above one threshold value. The controller 780 can be configured to determine the completion of the purging operation to purge contaminants from the filter 740 when the voltage signal receivable by the control valve 774 falls below another threshold value for a predefined time duration.

Thus, in view of the above, the filter assembly 730 can be referred to a filter pre-cleaner assembly or apparatus, particularly in an application related to air intake for an internal combustion engine.

Determining the clogging of the filter 740 includes measuring a pressure differential across the filter 710. This can be achieved by a pair of sensors 782 and 784 that are mounted within the respective chambers 722 and 724. Sensor 784 can be set as a baseline to determine an optimum range of the air flow in the outlet port 718. The sensor 782 then measures the actual air flow in the inlet port 716. When the difference between the airflows falls below a pre-selected value or even when the air flow in chamber 722 is lower than expected air flow in the chamber 720, the controller 780 can initiate the purging cycle. It will be also understood that the sensor 782 can be mounted within the inlet port 737 and the sensor 784 can be mounted within the outlet port 738, the inlet port 716 or can remain within the chamber 724. The controller 780 can be configured to determine a clogging of the filter 740, wherein the completion of the purging operation to purge contaminants from the filter 740 is determined when the determined clogging of the filter 740 is below the clogging threshold value. The nozzle is deactivated after a predetermined time has lapsed since the determination of the completion of the purging operation to purge contaminants from the filter 740.

The engine system 700 can comprise an engine 702 and the above described air intake system 704 that is fluidly coupled to the engine 702 to supply air to the engine 702 for combustion. The pre-cleaner filter assembly 730 can be deactivated after a predetermined time has lapsed since the determination of the completion of the purging operation to purge contaminants from the filter 740.

It will be understood, that although FIG. 22 illustrates movable nozzle(s) 750, the nozzles of FIGS. 5A-5C can be used as well. Furthermore, it will be understood that the device of FIGS. 19-20 can be used in the intake air system of FIG. 22. In other words, the pre-cleaner filter assembly 730 can be configured for a manual operation where the nozzles 750 will be manually moved to purge contaminants with supplied compressed air.

The housing 732 may be provide in two sections, as described above.

The flaps 760 can be replaced with the damper 496 of FIG. 15 or any other suitable device to automatically purge contaminants external to the housing 732.

The pre-cleaner filter assembly 730 can be also disposed horizontally or even at an incline in a relationship to the inlet port 716.

The nozzle(s) 750 with the conduit 754 can be referred to as "device".

The pre-cleaner filter assembly 730, either manually operated or automatically operated may replace the (main) air intake system 704.

Thus, in a further reference to FIG. 22, a method of pre-cleaning an intake air for consumption by vehicle with a diesel engine 702 can comprise attaching a housing 732 to an exterior surface of the vehicle where an air outlet of the housing is aligned with an air passageway into the diesel engine 702, mounting a filter 740 within the housing so that an air is passed from an inlet to the air outlet through a substrate of the filtering medium, positioning a port or a nozzle 750 for at least one of a linear movement and a rotational movement within a hollow interior of the filter, and expelling fluid under pressure through the port or the nozzle onto an exterior surface of the substrate, the fluid under pressure sufficient to dislodged trapped particulate matter from the substrate. The method can further comprise a step of removing dislodged particulate matter through a flap (trap door) 760 in the housing 732.

A method of pre-cleaning an intake air for consumption by vehicle with a diesel engine 702 may comprise the steps of mounting a filter external to the diesel engine 702 in an alignment with the air intake pipe so that an air is passed through a substrate of the filtering medium, positioning a port or a nozzle 750 for at least one of a linear movement and a rotational movement within a hollow interior of the filter, and expelling fluid under pressure through the port or the nozzle onto an exterior surface of the substrate, the fluid under pressure sufficient to dislodged trapped particulate matter from the substrate, the particulate matter being deposited by the air passing therethrough. The method can further comprise a step of attaching a housing onto the air intake pipe and positioning the filter within the housing, where an air outlet of the housing is aligned with an air inlet 716 into the internal combustion engine 702.

A method of for operating an air intake system 704 for an engine 702 (that can be a diesel engine type), the air intake system 704 including a first filter 710 configured to provide filtered air to the engine 702 for combustion, a second filter 740 configured to provide a pre-cleaned air to the first filter 710 and a device mounted for a linear movement within a hollow interior of the second filter 740, the method comprising activating the device, using a controller 780, to purge contaminants from the second filter 740 during a purging cycle to purge contaminants from the second filter 740, deactivating the device, using the controller 780, upon a determination of a completion of the purging cycle to purge contaminants from the second filter 740, and determining a clogging of one of the first filter 740 and the second filter 740, wherein the completion of the purging cycle to purge contaminants from the first filter 740 is determined when the determined clogging of the one of the first filter 740 and the second filter 740 is below a clogging threshold value. In the method, activating the nozzle 150 includes moving the nozzle 150 in a linear direction and expelling air under pressure from the nozzle 150. The method can further include discharging purged contaminants external to the second filter 740. In the method, discharging purged contaminants comprises opening a passageway in a housing of the second filter 740. In the method, opening the passageway can include manually moving a flap or a trap door to expose the passageway. In the method, opening the passageway includes activating an actuator, with the controller 780, the actuator configured to move a cover to expose the passageway. In the method, opening the passageway includes activating an actuator, with the controller 780, the actuator configured to rotate a damper within the passageway. In the method, opening the passageway includes manually opening a valve coupled to the passageway.

A method for operating an air intake system 704 for an engine 702, the air intake system 704 including an filter 740 configured to provide filtered air to the engine 702 for combustion and a device mounted for a linear movement within a hollow interior of a filtering medium in the filter 740, may comprise activating the device, using a controller 780, to purge contaminants from the filter 740 during a purging cycle to purge contaminants from the filter 740, deactivating the device, using the controller 780, upon a determination of a completion of the purging cycle to purge contaminants from the filter 740, and determining a clogging of the filter 740, wherein the completion of the purging cycle to purge contaminants from the filter 740 is determined when the determined clogging of the filter 740 is below a clogging threshold value. The method can further include determining an initiation of the purging cycle to purge contaminants from the filter 740, wherein the device is activated when the initiation of the purging cycle to purge contaminants from the filter 740 is determined. In the method, activating the device includes moving the device in a linear direction and expelling air under pressure from a nozzle in the device. The method can further include discharging purged contaminants external to the filter 740. In the method, discharging purged contaminants comprises opening a passageway in a housing of the filter 740. In the method, opening the passageway includes manually moving a cover to expose the passageway. In the method, opening the passageway includes activating an actuator, with the controller 780, to move a cover to expose the passageway. In the method, opening the passageway includes activating an actuator, with the controller 780, to rotate a damper within the passageway. In the method, opening the passageway includes manually opening a valve coupled to the passageway.

In the method, the air intake system 704 can comprise an air reservoir configured to store air at a pressure and configured to provide air to the device to purge contaminants from the filter 740 and a control valve 774 configured to control flow of air from the air reservoir to the device, wherein determining initiation of the purging cycle to purge contaminants from the filter 740 includes detecting, using the controller 780, a voltage signal receivable by the control valve 774, and determining, using the controller 780, the initiation of the purging cycle to purge contaminants from the filter 740 when the voltage signal is detected above one threshold value. The method can further include determining the completion of the purging cycle to purge contaminants from the filter 740 when the voltage signal receivable by the control valve 774 falls below another threshold value for a predefined time duration. In the method, the device is activated when the determined clogging of the filter 740 is above the clogging threshold value. In the method, the determining the clogging of the filter 740 includes measuring a pressure differential across the filter 740. In the method, the device is deactivated after a predetermined time has lapsed since the determination of the completion of the purging cycle to purge contaminants from the filter 740.

Any of the above described filter assemblies, that can be also referred to as a self-cleaning filter assembly or a filter assembly, provides an effective and economical approach of extending a life of the filter between replacements. In diesel engine applications, the above described filter assembly, used in a pre-cleaner arrangement, improves current methods and devices by preventing a larger percentage of contaminants from ever entering the engine's air intake system. This is not only going to help the engine run at optimum performance but can also reduce primary filter changes to about once a year, where many existing systems require a monthly filter replacement. Furthermore, in a pre-cleaner configuration, the above described pre-cleaner can also cut down on having to take the main air filters on and off and allowing dirt to enter the air intake system unnecessarily by changing out the main air filters.

Any of the above pre-cleaner assembly allows purging and removal of contaminants in a short period of time that can be few minutes.

Any of the above described filter assemblies can be configured to discharge contaminants in a safe and control manner instead of simply discharging them back into operating environment, where such contaminants can reenter the filter assembly. In other words, the disclosed subject matter is also directed to containment of contaminants from re-entering environment, thus resulting in a cleaner environment.

Figure 23:
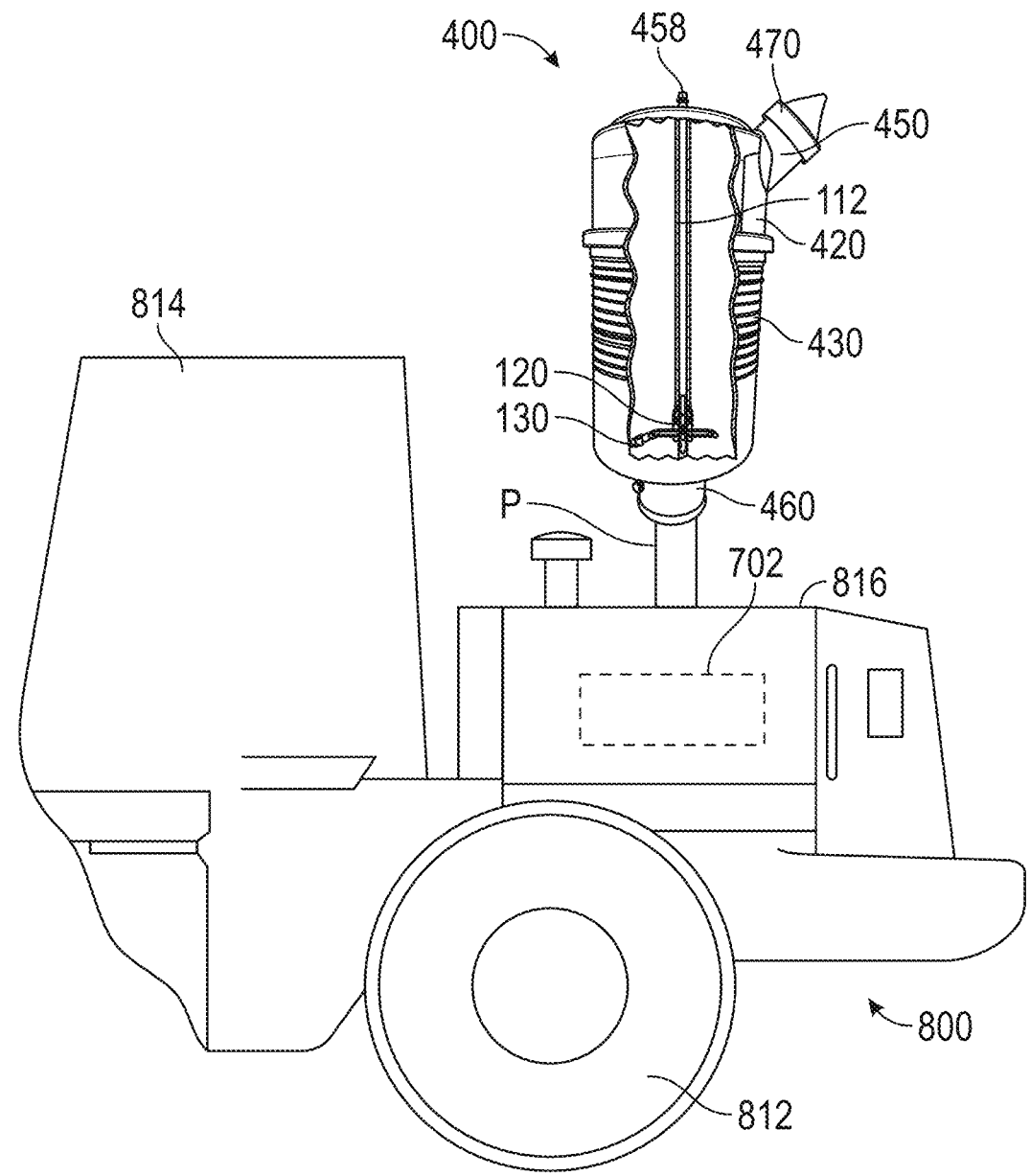
FIG. 23 illustrates an outline of a vehicle with an engine and with the apparatus of FIGS. 8-15.

FIG. 23 illustrates a partial diagram of a vehicle 800. The vehicle 800 may be a conventional automobile. The vehicle 800 may be a work vehicle. The vehicle comprises a frame 810 carried on the wheels 812. An interior compartment is referenced with a numeral 814. An engine is referenced with numeral 816 and is carried by the frame 810. When the vehicle 800 is provided as a work vehicle, the interior compartment 814 becomes an operating cab. The engine 816 may be an internal combustion engine for example as the internal combustion engine 702. FIG. 23 also illustrates the apparatus of FIGS. 8-15 connected to the air intake P, although any other apparatus, as described above, may be used with the vehicle 800.

Figure 24:
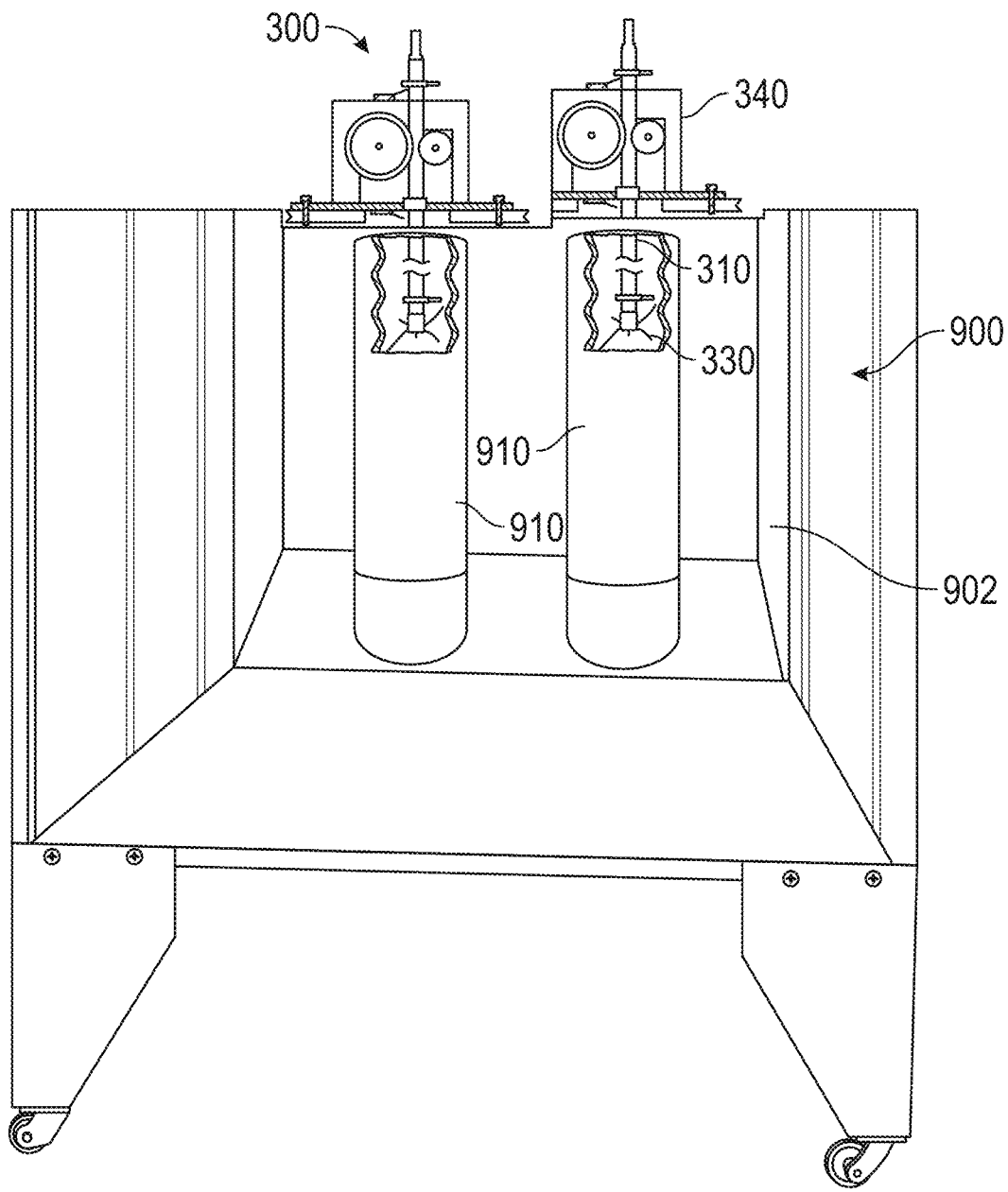
FIG. 24 illustrates an outline view of the apparatus of FIGS. 6-7 designed for use with a powder paint booth.

FIG. 24 illustrates the apparatus 300, as described above, designed to clean filtering medium 910 installed in an enclosure 902 that illustrates a powder spray booth. More specifically, the power transmission device 340 is positioned external to an exterior surface of the enclosure 902 of the powder spray booth and operable upon receipt of at least one of a power and control signal to move the conduit 310 along the longitudinal axis. During such linear movement, the rotor 320 and the nozzles 330 travel along the length of the filtering medium 910. In operation, the fluid existing the nozzles 330 under pressure dislodges contamination (trapped particulate matter) from the filtering medium 910 that can be then collected within the interior of the enclosure 902. The longitudinal axis of the conduit 310 is aligned with longitudinal axis of the filtering medium 910. In other words, the application of the apparatus 300 is not limited to the subject matter of FIG. 6 in that any number of filtering medium 910 can be provided within the enclosure 902 where a single apparatus 300 will be operatively installed at a respective filtering medium 910.

Thus, a method of cleaning filtering medium 910 in a powder spray booth comprises steps of attaching apparatus 300 to the paint booth enclosure 902 in a manner that introduces the conduit 310 into the hollow interior of the filtering medium 910, coupling the conduit 310 to a source of fluid under pressure, linearly moving the conduit 310 while emitting fluid under pressure through the nozzle(s) 330. The number of linear movements or strokes necessary to clean filtering medium 910 will depend at least on the amount of contamination within the honeycomb substrate of the filtering medium 910. In other words, more than one stroke may be needed to at least partially clean the filtering medium 910.

Use of the apparatus 300 in FIG. 24 eliminates a need of removing filtering medium 910 from the enclosure for remote servicing, thus reducing the downtime of the powder spray booth. In other words, the apparatus 300 in FIG. 24 can be configured for an in situ cleaning of filters employed within a powder paint booth.

The apparatus of FIG. 1 can replace the apparatus of FIGS. 6-7 in applications involving powder paint booth.

The apparatus of FIGS. 1-6 can be employed for in situ cleaning of filters with hollow interiors that are used in other applications for example in a cleaning machine configured to clean DPFs.

In view of the above, the present disclosure teaches a filtering medium cleaning apparatus, where the filtering medium has a hollow interior, the apparatus comprising an conduit having a hollow interior communicating a pressurized fluid flow therethrough and defining a longitudinal axis of the apparatus, the conduit being mounted for a reciprocal linear movement along the longitudinal axis, one or more nozzles attached to the conduit for the reciprocal linear movement therewith and in an open communication with the hollow interior, wherein a free end of the one or more nozzles is positioned in a proximity to an interior surface of the hollow interior of the filtering medium during use of the apparatus, a driving member mounted for a rotation in a plane having the conduit being mounted for the reciprocal linear movement, the driving member having a peripheral edge surface thereof positioned in a direct abutting contact with an exterior surface of the conduit, a motor having an output shaft thereof coupled axially to the driving member, the motor connectable to a source of electric energy, the motor operable to rotate the driving member in mutually opposite directions, a driven member mounted for a rotation in the plane and having a peripheral edge surface thereof positioned in a direct abutting contact with an exterior surface of the conduit, whereby the edge surface of the driving member and the edge surface of the driven member cage an exterior surface of the conduit therewithin so as to apply force thereto and guide the reciprocal linear movement of the conduit, and a control member controlling the reciprocal linear movement.

Where each of the driving and driven members comprises a disk-shaped member having a pair of spaced apart surfaces defining a thickness thereof and wherein the peripheral edge surface of the each of the driving and driven members has a concave shape in a plane normal to the pair of spaced apart surfaces.

Where a mounting member may be provided and having each of the motor, the driving member and the driven member being attached thereto.

Where an enclosure may be provided enclosing the each of the motor, the driving member and the driven member.

Where at least one of the driving and driven members has an axial aperture formed through a thickness thereof, wherein the mounting member has one or more threaded apertures, wherein the apparatus further includes a fastener having a body sized and shaped to be frictionally received within the axial aperture and having a threaded portion extending from one end of the body and being sized to be threadably received within a threaded aperture, and wherein an axis of the threaded portion is offset from an axis of the body.

Where the mounting member has one or more threaded apertures, wherein at least one of the driving and driven members has a threaded portion extending outwardly from one surface thereof and being sized to be threadably received within a threaded aperture, and wherein an axis of the threaded portion is offset from an axis of the at least one of the driving and driven members so as to move a respective peripheral edge surface toward and away form the exterior surface of the conduit.

Where at least one of the driving and driven members is mounted for a movement toward to and away from the conduit in a direction being normal to the longitudinal axis.

Where the control member includes a pair of actuating members and a pair of limit switches spaced apart from each other along the longitudinal axis and in electrical communication with the motor, each of the pair of actuating members secured on the exterior surface of the conduits adjacent one end thereof, wherein each of the pair of limit switches is mounted in a stationary position so as to be actuates or deactuated by a respective actuating member during the reciprocal linear movement of the conduit and wherein a spacing between the pair of limit switches defines a stroke or a travel distance of the conduit.

Where the control member comprises a controller coupled to the motor and including one or more processors and a non-transitory computer readable medium comprising executable instructions that, when executed by the one or more processors, cause the one or more processors to perform the steps of activating and deactivating the motor, calculating a stroke or a travel distance of the conduit based on user inputted or preset length of the filtering medium, causing the motor to move the conduit along the longitudinal axis so that one or more nozzles travel along a length of the filtering medium during the use of the apparatus.

Where an enclosure may be provided enclosing each of the driving member, driven member, motor and one or more nozzles.

In view of the above, the present disclosure teaches an in situ powder spray booth filtering medium cleaning apparatus, where the filtering medium has a hollow interior, the apparatus comprising an conduit having a hollow interior communicating a pressurized fluid flow therethrough and defining a longitudinal axis of the apparatus, the conduit being mounted for a reciprocal linear movement along the longitudinal axis, one or more nozzles attached to the conduit for the reciprocal linear movement therewith and in an open communication with the hollow interior, wherein a free end of the one or more nozzles is positioned in a proximity to an interior surface of the filtering medium during use of the apparatus, and a power transmission device at least partially positioned external to an exterior surface of a housing of the powder spray booth and operable upon receipt of at least one of a power and control signal to move the conduit along the longitudinal axis.

Where the power transmission device comprises a mounting member rigidly secured to an exterior surface of a housing of the powder spray booth, a driving member mounted for a rotation on the mounting member in a plane having the conduit being mounted for the reciprocal linear movement, the driving member having a peripheral edge surface thereof positioned in a direct abutting contact with an exterior surface of the conduit, an electric motor mounted on the mounting member having an output shaft thereof coupled axially to the driving member, the electric motor operable to rotate the driving member in mutually opposite directions, and a driven member mounted for a rotation on the mounting member in the plane and having a peripheral edge surface thereof positioned in a direct abutting contact with an exterior surface of the conduit, whereby the edge surface of the driving member and the edge surface of the driven member cage an exterior surface of the conduit therewithin so as to apply force thereto and guide the reciprocal linear movement of the conduit.

Where a control member may be provided to control the reciprocal linear movement.

In view of the above, the present disclosure teaches a method of pre-cleaning an intake air for consumption by vehicle with a diesel engine, the method comprising attaching a housing to an exterior surface of the vehicle where an air outlet of the housing is aligned with an air passageway into the diesel engine, mounting a filter within the housing so that an air is passed from an inlet to the air outlet through a substrate of the filtering medium, positioning a port or a nozzle for at least one of a linear movement and a rotational movement within a hollow interior of the filter, and expelling fluid under pressure through the port or the nozzle onto an exterior surface of the substrate, the fluid under pressure sufficient to dislodged trapped particulate matter from the substrate.

Where removal of dislodged particulate matter may be through a trap door in the housing. The trap door may comprise an opening with a cover, selectively opening and closing the opening.

In view of the above, the present disclosure teaches a method of pre-cleaning an intake air for consumption by vehicle with a diesel engine and an air intake pipe, the method comprising mounting a filter external to the diesel engine in an alignment with the air intake pipe so that an air is passed through a substrate of the filtering medium, positioning a port or a nozzle for at least one of a linear movement and a rotational movement within a hollow interior of the filter, and expelling fluid under pressure through the port or the nozzle onto an exterior surface of the substrate, the fluid under pressure sufficient to dislodged trapped particulate matter from the substrate, the particulate matter being deposited by the air passing therethrough.

Where the method can further comprise attaching a housing onto the air intake pipe and positioning the filter within the housing, where an air outlet of the housing is aligned with an air passageway into the diesel engine.

In view of the above, the present disclosure teaches a method for in situ cleaning of a hollow filtering medium installed in a powder spray booth, comprising mounting an conduit in an alignment with a longitudinal axis of the filtering medium and for a reciprocal movement within a hollow interior of the filtering medium, mounting nozzle(s) for a rotational movement about the conduit, moving, with a power transmission device positioned externally to a housing of the powder spray booth, the conduits with the nozzle(s), and expelling, during the movement of the conduit within the hollow interior of the filtering medium, a fluid under pressure through the nozzle(s) onto an exterior surface of the filtering medium, the fluid under pressure sufficient to dislodged trapped particulate matter from the filtering medium, the particulate matter being deposited onto the filtering medium during operation of the powder spray booth.

In view of the above, the present disclosure teaches a method for operating an air intake system for an engine, the air intake system including a first air filter configured to provide filtered air to the engine for combustion, a second air filter configured to provide a pre-cleaned air to the first filter and a device mounted for a linear movement within a hollow interior of the second air filter, the method comprising activating the device, using a controller, to purge contaminants from the second air filter during a purging cycle to purge contaminants from the second air filter, deactivating the device, using the controller, upon a determination of a completion of the purging cycle to purge contaminants from the second air filter, and determining a clogging of one of the first air filter and the second air filter, wherein the completion of the purging cycle to purge contaminants from the first air filter is determined when the determined clogging of the one of the first air filter and the second air filter is below a clogging threshold value.

Where activating the device includes moving the device in a linear direction and expelling air under pressure from a nozzle in the device.

Where discharging purged contaminants external may be provided to the second air filter.

Where discharging purged contaminants comprises opening a passageway in a housing of the second air filter.

Where opening the passageway includes manually moving a cover to expose the passageway.

Where opening the passageway includes activating an actuator, with the controller, the actuator configured to move a cover to expose the passageway.

Where opening the passageway includes activating an actuator, with the controller, the actuator configured to rotate a damper within the passageway.

Where opening the passageway includes manually opening a valve coupled to the passageway.

In view of the above, the present disclosure teaches a method for operating an air intake system for an engine, the air intake system including an air filter configured to provide filtered air to the engine for combustion and a device mounted for a linear movement within a hollow interior of a filtering medium in the air filter, the method comprising activating the device, using a controller, to purge contaminants from the air filter during a purging cycle to purge contaminants from the air filter, deactivating the device, using the controller, upon a determination of a completion of the purging cycle to purge contaminants from the air filter, and determining a clogging of the air filter, wherein the completion of the purging cycle to purge contaminants from the air filter is determined when the determined clogging of the air filter is below a clogging threshold value.

Where the method may further include determining an initiation of the purging cycle to purge contaminants from the air filter, wherein the device is activated when the initiation of the purging cycle to purge contaminants from the air filter is determined.

Where activating the device includes moving the device in a linear direction and expelling air under pressure from a nozzle in the device.

Where the method may further include discharging purged contaminants external to the air filter.

Where discharging purged contaminants comprises opening a passageway in a housing of the air filter.

Where opening the passageway includes manually moving a cover to expose the passageway.

Where opening the passageway includes activating an actuator, with the controller, to move a cover to expose the passageway.

Where opening the passageway includes activating an actuator, with the controller, to rotate a damper within the passageway.

Where opening the passageway includes manually opening a valve coupled to the passageway.

Where the air intake system comprises an air reservoir configured to store air at a pressure and configured to provide air to the device to purge contaminants from the air filter, and a control valve configured to control flow of air from the air reservoir to the device, wherein determining initiation of the purging cycle to purge contaminants from the air filter includes detecting, using the controller, a voltage signal receivable by the control valve, and determining, using the controller, the initiation of the purging cycle to purge contaminants from the air filter when the voltage signal is detected above one threshold value.

Where the method may further include determining the completion of the purging cycle to purge contaminants from the air filter when the voltage signal receivable by the control valve falls below another threshold value for a predefined time duration.

Where the device is activated when the determined clogging of the air filter is above the clogging threshold value.

Where the determining the clogging of the air filter includes measuring a pressure differential across the air filter.

Where the device is deactivated after a predetermined time has lapsed since the determination of the completion of the purging cycle to purge contaminants from the air filter.

In view of the above, the present disclosure teaches an air intake system for an engine, the air intake system comprising an air filter configured to provide filtered air to the engine for combustion, an air reservoir storing air at a pressure and configured to provide air to the air filter for a purging operation to purge contaminants from the air filter, a control valve configured to control flow of air from the air reservoir to the air filter, a device mounted for a linear movement within a hollow interior of a filtering medium in the air filter, and a controller configured to activate the device to expel air under pressure from the device and purge contaminants from the air filter during the purging operation to purge contaminants from the air filter, and deactivate the device upon determination of a completion of the purging operation to purge contaminants from the air filter, wherein the controller is configured to determine a clogging of the air filter, wherein the device is activated when the clogging of the air filter is above a clogging threshold value.

Where the controller is configured to determine an initiation of the purging operation to purge contaminants from the air filter, wherein the controller activates the device when the initiation of the purging operation to purge contaminants from the air filter is determined.

Where the controller is configured to determine initiation of the purging operation to purge contaminants from the air filter by detecting a voltage signal receivable by the control valve, and determining the initiation of the purging operation to purge contaminants from the air filter when the voltage signal is detected above one threshold value.

Where the controller is configured to determine the completion of the purging operation to purge contaminants from the air filter when the voltage signal receivable by the control valve falls below another threshold value for a predefined time duration.

Where the determining the clogging of the air filter includes measuring a pressure differential across the air filter.

Where the controller is configured to determine a clogging of the air filter, wherein the completion of the purging operation to purge contaminants from the air filter is determined when the determined clogging of the air filter is below the clogging threshold value.

Where the device is deactivated after a predetermined time has lapsed since the determination of the completion of the purging operation to purge contaminants from the air filter.

In view of the above, the present disclosure teaches an engine system, comprising an engine, and an air intake system fluidly coupled to the engine to supply air to the engine for combustion, the air intake system including an air filter to filter air supplied to the engine, an air reservoir storing air at a pressure and configured to provide air to the air filter for a purging operation to purge contaminants from the air filter of contaminants, a control valve configured to control flow of air from the air reservoir to the air filter, a device mounted for a linear movement within a hollow interior of a filtering medium in the air filter, and a controller configured to determine an initiation of the purging operation to purge contaminants from the air filter, activate the device when the initiation of the purging operation to purge contaminants from the air filter is determined, and deactivate the device upon determination of a completion of the purging operation to purge contaminants from the air filter, wherein the controller is configured to determine the initiation of the purging operation to purge contaminants from the air filter by detecting a voltage signal receivable by the control valve, and determining the initiation of the purging of the air filter when the voltage signal is detected above a threshold value.

Where the controller is configured to determine the completion of the purging operation to purge contaminants from the air filter when the voltage signal receivable by the control valve falls below the threshold value for a predefined time duration.

Where the device is deactivated after a predetermined time has lapsed since the determination of the completion of the purging operation to purge contaminants from the air filter.

In view of the above, the present disclosure teaches a n air cleaner assembly, comprising a housing including an outer wall defining an air flow inlet, an air flow outlet, a sidewall having an opening therein, and a hollow interior section, the housing being openable for service access to the hollow interior section, a filter cartridge positioned in the housing hollow interior section, the filter cartridge being selectively removable from the air cleaner housing, the filter cartridge comprising filter media surrounding an open central interior, a nozzle mounted, within the open central interior, for each of a linear movement and a rotation about a longitudinal axis of the housing, the nozzle operable, during the linear movement, to direct a flow of compressed gas toward to an interior surface of the filter media and through a thickness of the filter media to expel contaminants therefrom, and an evacuation valve arrangement mounted to the housing adapted to direct dust radially out of the air cleaner housing, the valve arrangement comprising a frame, a diaphragm mounted for reciprocation in relation to the frame and shiftably seated over the sidewall opening between an open position spaced from the sidewall opening and a closed position covering the sidewall opening, and a spring for urging the diaphragm into the closed position.

In view of the above, the present disclosure teaches a self-cleaning air filter, comprising a housing comprising a first portion, and a second portion, the first portion and the second portion defining each of a hollow interior and a peripheral inner surface of the housing, a fastener, the fastener detachably attaching the second portion to the first portion, a filter disposed within the hollow interior between an interior end surface of the first portion and an interior end surface of the second portion, an outer peripheral surface of the filter being inset from the peripheral inner surface of the housing and defining an open space, the filter comprising a filtering medium, the filtering medium disposed between the inner peripheral surface of the filter and the outer peripheral surface of the filter, a first air inlet, the first air inlet coupled to the first portion in a fluid communication with the open space, an air outlet, the air outlet coupled to the second portion in the fluid communication with the hollow interior, a second air inlet, the second air inlet configured to connect to compressed air source, a nozzle, the nozzle coupled to the second air inlet in a fluid communication therewith, the nozzle disposed within the air passage, an opening through a wall thickness in the second portion, and a cover, the cover mounted to the second portion to selectively open and close the opening, the nozzle operable to expel the compressed air through the filtering medium and purge contaminants in the filtering medium into the open space and toward the opening, the opening, when opened by the flap, facilitates a discharge of the contaminants external to the housing.

Where the fastener comprises two clasps.

Where the filter comprises one of a tubular shape and a cylindrical shape.

Where the nozzle is mounted for a rotation within the air passage.

Where the nozzle is mounted for each of a rotation within the air passage and a linear movement between the inner surface of the first portion and the inner surface of the second portion.

Where the nozzle comprises a plurality of nozzles, the plurality of nozzles spaced apart equally with each other in a plane being normal to a distance between the inner surface of the first portion and the inner surface of the second portion.

Where the nozzle comprises a plurality of nozzles, the plurality of nozzles spaced apart with each other along a distance between the inner surface of the first portion and the inner surface of the second portion, the plurality of nozzles are mounted for a rotation within the air passage.

Where the nozzle comprises a plurality of nozzles, the plurality of nozzles spaced apart with each other along a distance between the inner end surface of the first portion and the inner end surface of the second portion, the plurality of nozzles configured to expel the compressed air in different directions from each other.

Where the nozzle comprises a plurality of nozzles, the plurality of nozzles being mounted for at least one of a rotation and a linear movement.

Where a valve may be provided on the first air inlet.

In view of the above, the present disclosure teaches a self-cleaning air filter, comprising a housing comprising a first portion, and a second portion, the first portion and the second portion defining each of a hollow interior and a peripheral inner surface of the housing, a fastener, the fastener detachably attaching the second portion to the first portion, a first air inlet, the first air inlet coupled to the first portion in a fluid communication with an open space, an air outlet, the air outlet coupled to the second portion in the fluid communication with the hollow interior, a second air inlet, the second air inlet configured to connect to compressed air source, a filter disposed within the hollow interior between an inner end surface of the first portion and an inner end surface of the second portion, an inner peripheral surface of the filter defining an air passage from the first air inlet to the air outlet, an outer peripheral surface of the filter is inset from the peripheral inner surface of the housing and defining the open space, the filter comprising a filtering medium, the filtering medium disposed between the inner peripheral surface of the filter and the outer peripheral surface of the filter, and a nozzle, the nozzle coupled to the second air inlet in a fluid communication therewith, the nozzle disposed within the air passage, the nozzle operable to expel the compressed air through the filtering medium and purge contaminants in the filtering medium into the open space and toward the second portion, the second portion, when detached from the first portion at the fastener discharges the contaminants external to the housing.

In view of the above, the present disclosure teaches a self-cleaning air filter, comprising a housing comprising a first portion, and a second portion, the first portion and the second portion defining each of a hollow interior and a peripheral inner surface of the housing, a fastener, the fastener detachably attaching the second portion to the first portion, a first air inlet, the first air inlet coupled to the first portion in a fluid communication with the open space, an air outlet, the air outlet coupled to the second portion in the fluid communication with the hollow interior, a second air inlet, the second air inlet configured to connect to compressed air source, a filter disposed within the hollow interior between an end inner surface of the first portion and an end inner surface of the second portion, an inner peripheral surface of the filter defining an air passage from the first air inlet to the air outlet, an outer peripheral surface of the filter is inset from the peripheral inner surface of the housing and defining an open space, the filter comprising a filtering medium, the filtering medium disposed between the inner peripheral surface of the filter and the outer peripheral surface of the filter, a nozzle, the nozzle coupled to the second air inlet in a fluid communication therewith, the nozzle disposed within the air passage, a contaminant outlet, the contaminant outlet in an open communication with the open space, a damper mounted within the contaminant outlet for a movement between a first position where the damper closes the contaminant outlet and a second position where the damper opens the contaminant outlet, the nozzle operable to expel the compressed air through the filtering medium and purge contaminants in the filtering medium into the open space and toward the second portion, the contaminant outlet, when open through the damper, discharges the contaminants external to the housing.

Where the air filter may further comprise an actuator, the actuator coupled to the damper, the actuator operable to move the damper between the first and second positions.

Where the actuator comprises a rotary solenoid valve.

Where the actuator comprises a rotary pneumatic actuator.

Where the air filter may further comprise a lever disposed external to the contaminant outlet, the lever connected to the damper, the lever operable to move the damper between the first and second positions.

In view of the above, the present disclosure teaches an air cleaner assembly, comprising a housing including an outer wall defining an air flow inlet, an air flow outlet, a sidewall having an opening therein, and a hollow interior section, the housing being openable for service access to the hollow interior section, a serviceable filter cartridge positioned in the housing hollow interior section, the filter cartridge being selectively removable from the air cleaner housing, and the filter cartridge comprising filter media surrounding an open central interior, a plurality of nozzles disposed within the open central interior, the plurality of nozzles spaced apart with each other along a length of the serviceable filter cartridge, a pulse jet distribution arrangement communicating with the hollow interior section of the housing, including the nozzle, configured to supply the pulse of compressed gas to the nozzle, and an evacuation valve arrangement mounted to the housing adapted to direct contaminants radially out of the air cleaner housing, the valve arrangement comprising a frame, a diaphragm mounted for reciprocation in relation to the frame and shiftably seated over the sidewall opening between an open position spaced from the sidewall opening and a closed position covering the sidewall opening, and a spring for urging the diaphragm into the closed position.

Where the plurality of nozzles are mounted for a rotation within the open central interior.

In view of the above, the present disclosure teaches a self-cleaning air filter assembly connected to an associated compressed air source, the self-cleaning air filter assembly comprising a housing defining a chamber located therein, a hollow filter with a filtering medium, the hollow filter disposed within the chamber such that an open interior volume is defined within the filter and an exterior volume is defined between the filter and an interior wall of the housing, whereby during a filtering cycle a negative pressure differential between the interior volume and the exterior volume draws airflow inward through the filter and during a self-cleaning cycle a positive pressure differential between the interior volume and the exterior volume forces airflow outward through the filter, a plurality of nozzles disposed within an open central interior, the plurality of nozzles spaced apart with each other along a length of the filter, a valve in communication with the housing and connected to the associated compressed air source for selectively releasing a pulse of compressed air into the nozzle whereby contaminants in the filtering medium of the filter is dislodged from an exterior surface of the filter into the housing chamber, and a vent mounted to a side wall of the housing, over a sidewall opening therein, for venting the pulse of compressed air from the housing, the vent comprising a frame, a diaphragm mounted for reciprocation in relation to the frame and shiftably seated over the sidewall opening between an open position spaced from the sidewall opening and a closed position covering the sidewall opening, and a spring for urging the diaphragm into the closed position.

Where the plurality of nozzles are mounted for a rotation within the open central interior.

In view of the above, the present disclosure teaches an air cleaner assembly, comprising a housing including an outer wall defining an air flow inlet, an air flow outlet, a sidewall having a sidewall opening therein, and a hollow interior section, the housing being openable for service access to the hollow interior section, a serviceable filter cartridge positioned in the housing hollow interior section, the filter cartridge being selectively removable from the air cleaner housing, and the filter cartridge comprising filter media surrounding an open central interior, a nozzle mounted, within the open central interior, for each of a linear movement and a rotation about a longitudinal axis of the housing, the nozzle operable, during the linear movement, to direct a pulse of compressed gas toward to an interior surface of the filter media and through a thickness of the filter media to expel contaminants therefrom, a pulse jet distribution arrangement communicating with the hollow interior section of the housing, including the nozzle, configured to direct a pulse of compressed gas onto an interior surface of the filter media, and an evacuation valve arrangement mounted to the housing adapted to direct contaminants radially out of the air cleaner housing, the valve arrangement comprising a frame, a diaphragm mounted for reciprocation in relation to the frame and shiftably seated over the sidewall opening between an open position spaced from the sidewall opening and a closed position covering the sidewall opening, and a spring for urging the diaphragm into the closed position.

In view of the above, the present disclosure teaches a self-cleaning air filter assembly connected to an associated compressed air source, the self-cleaning air filter assembly comprising a housing defining a chamber located therein, a hollow filter disposed within the chamber such that an open interior volume is defined within the filter and an exterior volume is defined between the filter and an interior wall of the housing, whereby during a filtering cycle a negative pressure differential between the interior volume and the exterior volume draws airflow inward through the filter and during a self-cleaning cycle a positive pressure differential between the interior volume and the exterior volume forces airflow outward through the filter, a nozzle mounted, within the hollow filter, for each of a linear movement and a rotation about a longitudinal axis of the housing, the nozzle operable, during the linear movement, to direct a pulse of compressed gas toward to an interior surface of the hollow filter and through a thickness of the hollow filter to expel contaminants therefrom, a valve in communication with the housing and connected to the associated compressed air source for selectively releasing a pulse of compressed air into the nozzle whereby contaminates are dislodged from an exterior surface of the filter into the housing chamber, and a vent mounted to a side wall of the housing, over an opening therein, for venting the pulse of compressed air from the housing, the vent comprising a frame, a diaphragm mounted for reciprocation in relation to the frame and shiftably seated over the opening between an open position spaced from the sidewall opening and a closed position covering the opening, and a spring for urging the diaphragm into the closed position.

The chosen exemplary embodiments of the claimed subject matter have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the subject matter may be made by those skilled in the art without departing from the spirit and scope of the subject matter as set forth in the appended claims.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

What is claimed is:

1. A filter housing, comprising:
   a first end, a second end and a peripheral side wall, said peripheral side wall defining, in a combination with first and second ends, a hollow interior of said filter housing;
   an air inlet at said first end of said filter housing, said air inlet being in an open communication with said hollow interior;
   an air outlet at said second end of said filter housing, said air outlet being in an open communication with said hollow interior;
   an opening through said first end;
   an opening through said second end, said opening through said second end being disposed between said air outlet and an interior surface of said peripheral side wall;
   a cover; and
   a connection between said cover and an exterior surface of said peripheral side wall so that said cover selectively opens and closes said opening through said second end.

2. The filter housing of claim 1, further comprising an opening through said second end, said opening through said second end being disposed between said air outlet and an interior surface of said peripheral side wall.

3. The filter housing of claim 1, wherein said hollow interior is being sized to receive a hollow filter cartridge therewithin, said opening through said second end being disposed between an exterior surface of said hollow filter cartridge received within said hollow interior and said interior surface of said peripheral side wall.

4. The filter housing of claim 2, further comprising a cover and a connection between said cover and an exterior surface of said peripheral side wall so said cover selectively opens and closes said opening through said second end.

5. The filter housing of claim 1, further comprising an opening through said peripheral side wall adjacent said second end.

6. The filter housing of claim 5, further comprising a damper mounted for a rotation within said opening through said peripheral side wall.

7. The filter housing of claim 5, further comprising a valve mounted on said filter housing in an alignment with said opening through said peripheral side wall.

8. The filter housing of claim 1, further comprising a receptacle coupled to said first end in an alignment with said opening through said first end, said receptacle being disposed on an exterior surface of said first end.

9. The filter housing of claim 1, further comprising a receptacle coupled to said first end in an alignment with said opening through said first end, said receptacle being disposed on an interior surface of said first end and within said hollow interior.

10. The filter housing of claim 1, further comprising a canopy, said canopy being sized and shaped to shield said air inlet from environmental elements.

11. The filter housing of claim 1, further comprising:
   a conduit passed through said opening through said first end, said conduit comprising a hollow interior designed to communicate a pressurized fluid flow therethrough, said conduit defining a longitudinal axis;
   a nozzle on said conduit in an open communication with said hollow interior; and
      an apparatus to reciprocally move said conduit in a linear direction along said longitudinal axis, said apparatus comprising:
      a driving member mounted for a rotation in a plane having said conduit being mounted for a reciprocal linear movement, said driving member having a peripheral edge surface thereof positioned in a direct abutting contact with an exterior surface of said conduit,
      a motor having an output shaft thereof coupled axially to said driving member, said motor connectable to a source of electric energy, said motor operable to rotate said driving member in mutually opposite directions, and
      a driven member mounted for a rotation in said plane and having a peripheral edge surface thereof positioned in a direct abutting contact with an exterior surface of said conduit, whereby said peripheral edge surface of said driving member and said peripheral edge surface of said driven member cage an exterior surface of said conduit therewithin so as to apply force thereto and move said conduit.

12. A filter cleaning apparatus, comprising:
a filter housing, said filter housing comprising:
  a first end, a second end and a peripheral side wall, said peripheral side wall defining, in a combination with first and second ends, a hollow interior of said filter housing,
  an air inlet at said first end of said filter housing, said air inlet being in an open communication with said hollow interior,
  an air outlet at said second end of said filter housing, said air outlet being in an open communication with said hollow interior, and
  an opening through said first end;
a conduit passed through said opening through said first end, said conduit comprising a hollow interior designed to communicate a pressurized fluid flow therethrough, said conduit defining a longitudinal axis of said filter cleaning apparatus, said second end of said filter housing being separated from said first end of said filter housing along said longitudinal axis;
a nozzle on said conduit in an open communication with said hollow interior; and
an apparatus to reciprocally move said conduit in a linear direction along said longitudinal axis, said apparatus including at least:
  a driving member mounted for a rotation in a plane having said conduit being mounted for a reciprocal linear movement, said driving member having a peripheral edge surface thereof positioned in a direct abutting contact with an exterior surface of said conduit,
  a motor having an output shaft thereof coupled axially to said driving member, said motor connectable to a source of electric energy, said motor operable to rotate said driving member in mutually opposite directions, and
  a driven member mounted for a rotation in said plane and having a peripheral edge surface thereof positioned in a direct abutting contact with said exterior surface of said conduit, whereby said peripheral edge surface of said driving member and said peripheral edge surface of said driven member cage an exterior surface of said conduit therewithin so as to apply a force thereto and move said conduit.

13. The filter cleaning apparatus of claim 12, wherein said nozzle comprises a plurality of nozzles extending from an exterior surface of said conduit, said plurality of nozzles being spaced with each other along a length of said conduit.

14. The filter cleaning apparatus of claim 12, wherein said nozzle comprises a plurality of nozzles mounted for a rotation on an end of said conduit.

15. The filter cleaning apparatus of claim 12, further comprising a filter cartridge disposed within said hollow interior, said filter cartridge comprising a hollow interior in a fluid communication with said air outlet, said nozzle being positioned within said hollow interior of said filter cartridge.

16. The filter cleaning apparatus of claim 12, wherein each of said driving and driven members comprises a disk shaped member having a pair of spaced apart surfaces defining a thickness thereof and wherein said peripheral edge surface of said each of said driving and driven members has a concave shape in a plane normal to said pair of spaced apart surfaces.

17. The filter cleaning apparatus of claim 12, further comprising a mounting member having each of said motor, said driving member and said driven member being attached thereto.

18. The apparatus, according to claim 12, further comprising an enclosure enclosing said each of said motor, said driving member and said driven member.

19. The filter cleaning apparatus of claim 12, further comprising a control member, said control member comprising a pair of switch actuators and a pair of limit switches spaced apart from each other along said longitudinal axis and in electrical communication with said motor, each of said pair of switch actuators secured on said exterior surface of said conduit adjacent one end thereof, wherein each of said pair of limit switches is mounted in a stationary position so as to be actuated or deactuated by a respective switch actuator during said reciprocal linear movement of said conduit and wherein a spacing between said pair of limit switches defines a stroke or a travel distance of said conduit.

20. The filter cleaning apparatus of claim 12, further comprising a controller coupled to said motor, said controller including a processing device and a non-transitory computer readable medium comprising executable instructions that, when executed by said processing device, cause said processing device to activate and deactivate said motor, calculate a stroke or a travel distance of said conduit based on a user inputted value or a preset length of a filtering medium, and cause said motor to move said conduit with said nozzle along said longitudinal axis.

21. A housing, comprising:
a first end, a second end and a peripheral side wall, said peripheral side wall defining, in a combination with first and second ends, a hollow interior of said housing;
an inlet at said first end of said housing, said inlet being in an open communication with said hollow interior;
an outlet at said second end of said housing, said outlet being in an open communication with said hollow interior;
an opening through said peripheral side wall adjacent said second end; and
damper mounted for a rotation within said opening through said peripheral side wall.

22. A housing, comprising:
a first end, a second end and a peripheral side wall, said peripheral side wall defining, in a combination with first and second ends, a hollow interior of said housing;
an air inlet at said first end of said housing, said air inlet being in an open communication with said hollow interior;
an air outlet at said second end of said housing, said air outlet being in an open communication with said hollow interior;
an opening through said peripheral side wall adjacent said second end; and
a valve mounted on said housing in an alignment with said opening through said peripheral side wall.

23. A housing, comprising:
a first end, a second end and a peripheral side wall, said peripheral side wall defining, in a combination with first and second ends, a hollow interior of said housing;
an inlet at said first end of said housing, said inlet being in an open communication with said hollow interior;

an outlet at said second end of said housing, said outlet being in an open communication with said hollow interior; and a receptacle coupled to said first end in an alignment with an opening through said first end, said receptacle being disposed on an interior surface of said first end and within said hollow interior.

24. A housing, comprising:

a first end, a second end and a peripheral side wall, said peripheral side wall defining, in a combination with first and second ends, a hollow interior of said housing;

an inlet at said first end of said housing, said inlet being in an open communication with said hollow interior;

an outlet at said second end of said housing, said outlet being in an open communication with said hollow interior; and a canopy, said canopy being sized and shaped to shield said inlet from environmental elements.

\* \* \* \* \*